US012711606B2

(12) United States Patent
Murakami

(10) Patent No.: US 12,711,606 B2
(45) Date of Patent: Aug. 18, 2026

(54) INSPECTION APPARATUS, INSPECTION SYSTEM, AND INSPECTION METHOD

(71) Applicant: CANON KABUSHIKI KAISHA, Tokyo (JP)

(72) Inventor: Katsuyuki Murakami, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 297 days.

(21) Appl. No.: 18/432,965

(22) Filed: Feb. 5, 2024

(65) Prior Publication Data

US 2024/0265523 A1 Aug. 8, 2024

(30) Foreign Application Priority Data

Feb. 7, 2023 (JP) ................................ 2023-016800

(51) Int. Cl.

| | |
|---|---|
| ***G06K 9/00*** | (2022.01) |
| ***G06T 3/4023*** | (2024.01) |
| ***G06T 7/00*** | (2017.01) |
| ***H04N 1/00*** | (2006.01) |

(52) U.S. Cl.

CPC ........... *G06T 7/001* (2013.01); *G06T 3/4023* (2013.01); *H04N 1/00045* (2013.01); *G06T 2207/10008* (2013.01); *G06T 2207/30144* (2013.01)

(58) Field of Classification Search

CPC .................. G06T 7/001; G06T 3/4023; G06T 2207/10008; G06T 2207/30144; H04N 1/00045

See application file for complete search history.

(56) References Cited

U.S. PATENT DOCUMENTS

| | | | | |
|---|---|---|---|---|
| 6,678,067 | B1 * | 1/2004 | Reda | G06V 30/147 358/1.14 |
| 8,654,398 | B2 * | 2/2014 | Dewancker | H04N 1/00039 358/1.9 |
| 8,743,425 | B2 * | 6/2014 | Simske | H04N 1/00045 358/1.6 |
| 9,007,658 | B2 * | 4/2015 | Ito | B41F 33/0036 358/1.9 |
| 9,569,837 | B2 * | 2/2017 | Madden | G06K 15/024 |
| 10,775,317 | B2 * | 9/2020 | Yamazaki | G06T 1/00 |
| 11,094,054 | B2 * | 8/2021 | Kaneko | G06T 7/001 |
| 11,250,558 | B2 * | 2/2022 | Oki | G06T 7/001 |
| 11,303,762 | B2 * | 4/2022 | Takayama | G06T 7/0004 |

(Continued)

FOREIGN PATENT DOCUMENTS

JP 2014134401 A 7/2014

*Primary Examiner* — Shervin K Nakhjavan

(74) *Attorney, Agent, or Firm* — Canon U.S.A., Inc. IP Division

(57) ABSTRACT

An inspection apparatus configured to inspect a print product obtained by an image forming apparatus performing print on a recording sheet, includes one or more controllers having one or more processors and one or more memories. The one or more controllers are configured to acquire an image and information about a non-print region as a region in which no image is printed on the recording sheet by the image forming apparatus, register an image having been processed based on the information about the non-print region, as a correct answer image, and inspect, in response to acquiring a scan image obtained by scanning the print product with an image printed on the recording sheet, the scan image based on the correct answer image.

10 Claims, 15 Drawing Sheets

(56) References Cited

U.S. PATENT DOCUMENTS

| | | | | |
|---|---|---|---|---|
| 11,776,107 | B2 * | 10/2023 | Seki | H04N 1/00037 358/1.14 |
| 12,272,081 | B2 * | 4/2025 | Koyama | G06V 10/44 |
| 2004/0179717 | A1 * | 9/2004 | Furukawa | G06T 7/001 382/112 |
| 2020/0250805 | A1 * | 8/2020 | Tsukamoto | G06T 7/0002 |
| 2020/0286218 | A1 * | 9/2020 | Ikeda | G06T 7/136 |
| 2021/0264581 | A1 * | 8/2021 | Ishii | G06K 15/027 |
| 2021/0304385 | A1 * | 9/2021 | Nakada | G06T 7/136 |
| 2021/0334953 | A1 * | 10/2021 | Seki | G01N 21/892 |
| 2022/0172334 | A1 * | 6/2022 | Takeuchi | H04N 1/00021 |
| 2022/0261975 | A1 * | 8/2022 | Hershman | G06F 3/1219 |
| 2023/0083271 | A1 * | 3/2023 | Yamamoto | G06T 7/0004 382/112 |
| 2024/0087109 | A1 * | 3/2024 | Komazawa | G06T 7/001 |
| 2024/0104716 | A1 * | 3/2024 | Ohkawa | H04N 1/00034 |

* cited by examiner

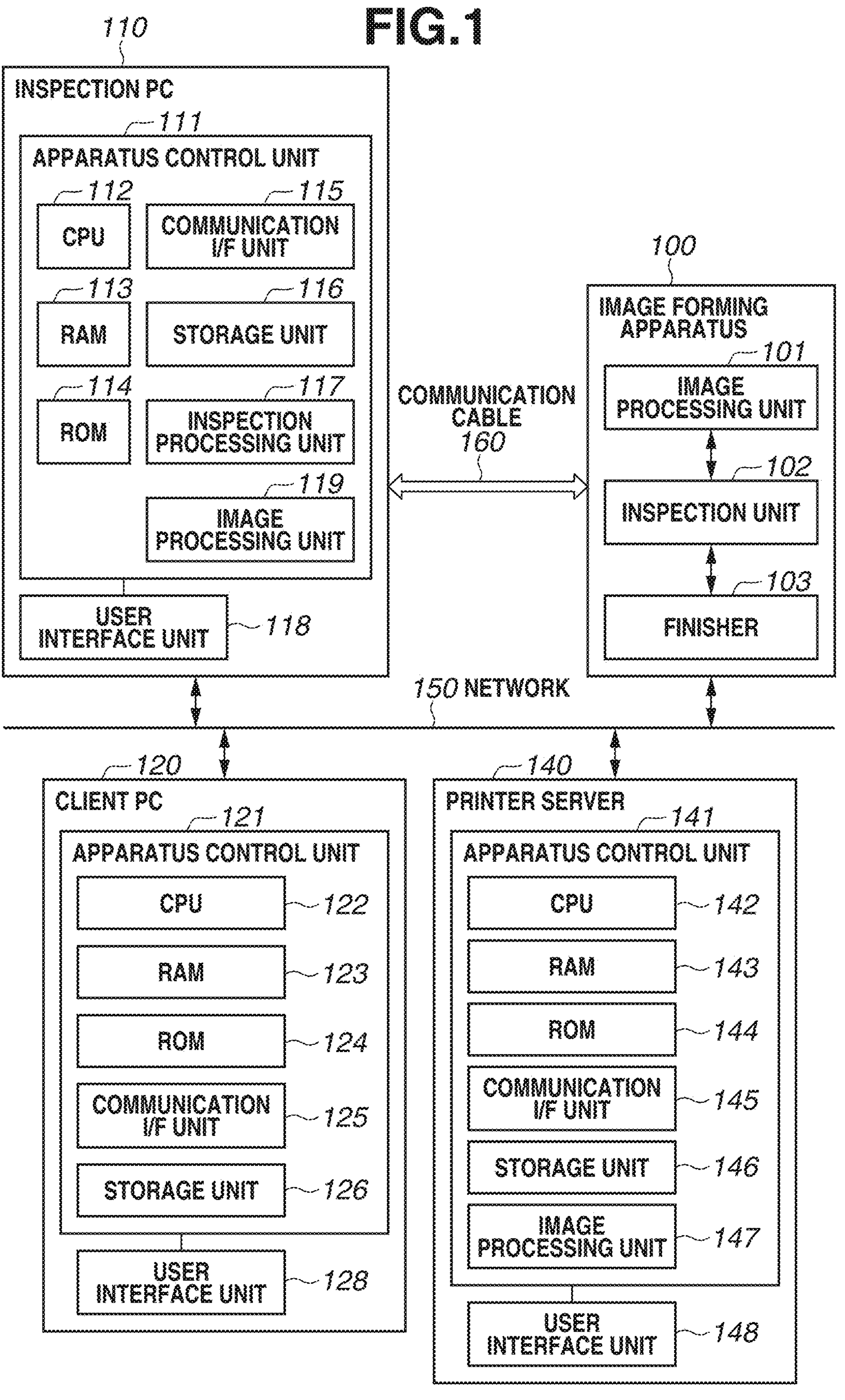
FIG.1
110
INSPECTION PC
111
APPARATUS CONTROL UNIT
112
CPU
115
COMMUNICATION I/F UNIT
113
RAM
116
STORAGE UNIT
114
ROM
117
INSPECTION PROCESSING UNIT
119
IMAGE PROCESSING UNIT
USER INTERFACE UNIT
118
COMMUNICATION CABLE
160
100
IMAGE FORMING APPARATUS
101
IMAGE PROCESSING UNIT
102
INSPECTION UNIT
103
FINISHER
150 NETWORK
120
CLIENT PC
121
APPARATUS CONTROL UNIT
CPU
122
RAM
123
ROM
124
COMMUNICATION I/F UNIT
125
STORAGE UNIT
126
USER INTERFACE UNIT
128
140
PRINTER SERVER
141
APPARATUS CONTROL UNIT
CPU
142
RAM
143
ROM
144
COMMUNICATION I/F UNIT
145
STORAGE UNIT
146
IMAGE PROCESSING UNIT
147
USER INTERFACE UNIT
148

FIG.7

| SHEET SIZE | NUMBER OF PIXELS IN MAIN SCANNING DIRECTION | NUMBER OF PIXELS IN SUB SCANNING DIRECTION |
|---|---|---|
| A5 | 4961 | 3496 |
| A5R | 3496 | 4961 |
| A4 | 7016 | 4961 |
| A4R | 4961 | 7016 |
| A3 | 7016 | 9921 |
| B5 | 6071 | 4299 |
| B5R | 4299 | 6071 |
| B4 | 6071 | 8598 |

FIG.9

| UI SETTING VALUE | TOP | BOTTOM | LEFT | RIGHT |
|---|---|---|---|---|
| CENTER | 1 | 1 | 1 | 1 |
| UPPER LEFT | 0 | 2 | 0 | 2 |
| UPPER CENTER | 0 | 2 | 1 | 1 |
| UPPER RIGHT | 0 | 2 | 2 | 0 |
| RIGHT CENTER | 1 | 1 | 2 | 0 |
| BOTTOM RIGHT | 2 | 0 | 2 | 0 |
| BOTTOM CENTER | 2 | 0 | 1 | 1 |
| BOTTOM LEFT | 2 | 0 | 0 | 2 |
| LEFT CENTER | 1 | 1 | 0 | 2 |

FIG.11A
FIG.11B
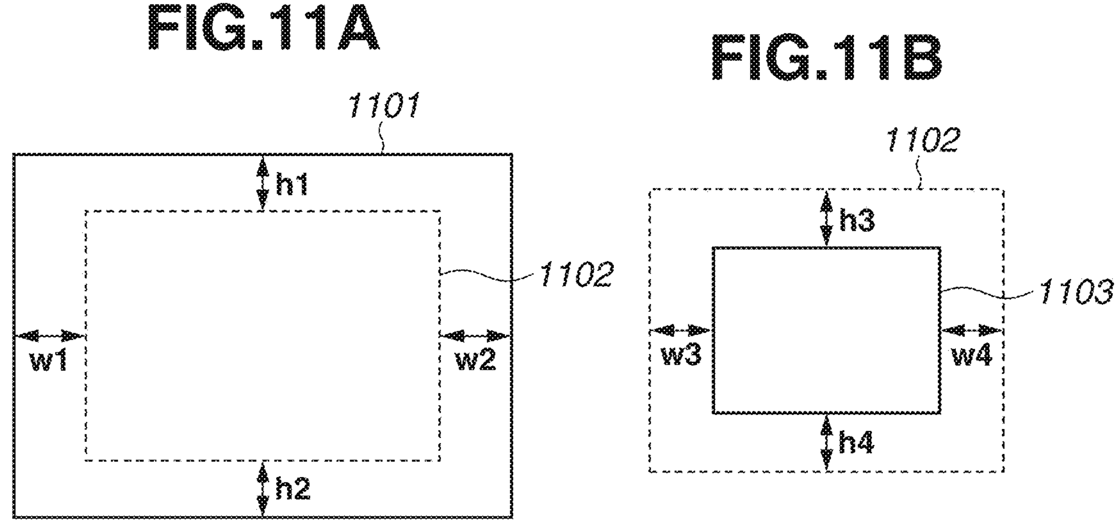
FIG.11C
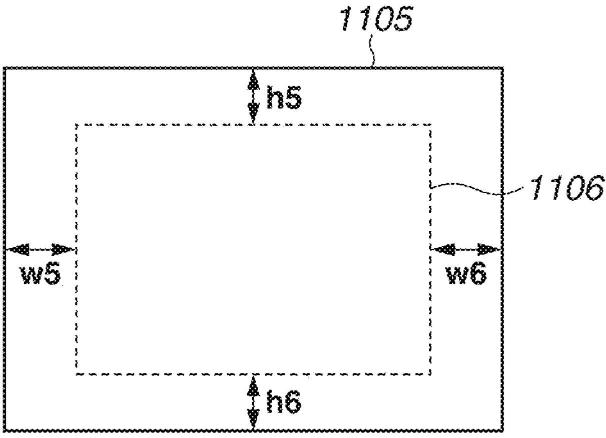

INSPECTION APPARATUS, INSPECTION SYSTEM, AND INSPECTION METHOD

BACKGROUND

Field of the Disclosure

The present disclosure relates to an inspection apparatus, an inspection system, and an inspection method.

Description of the Related Art

Although print products have been conventionally manually inspected, an apparatus for automatically performing the inspection as post-processing of a printer has been recently used. In such an inspection apparatus, correct answer image data is initially registered. Then, an image forming apparatus prints out input image data on a sheet, and an image reading apparatus included in the inspection apparatus reads the data printed on the sheet. An inspection personal computer (PC) capable of performing real-time processing compares scan image data read by the image reading apparatus with the initially registered correct answer image data to detect a defective image, thus automatically inspecting the print product.

Japanese Patent Application Laid-Open No. 2014-134401 discusses a method in which an inspection system subjects print data to Raster Image Processor (RIP) processing to convert the print data into image data and uses the image data as correct answer image data.

SUMMARY

According to embodiments of the present disclosure, an inspection apparatus configured to inspect a print product obtained by an image forming apparatus performing print on a recording sheet, includes one or more controllers having one or more processors and one or more memories. The one or more controllers are configured to acquire an image and information about a non-print region as a region in which no image is printed on the recording sheet by the image forming apparatus, register an image having been processed based on the information about the non-print region, as a correct answer image, and inspect, in response to acquiring a scan image obtained by scanning the print product with an image printed on the recording sheet, the scan image based on the correct answer image.

Further features of the present disclosure will become apparent from the following description of exemplary embodiments with reference to the attached drawings.

BRIEF DESCRIPTION OF THE DRAWINGS

FIG. 1 illustrates an example of an overall configuration of an inspection system according to an exemplary embodiment.

FIG. 7 illustrates an example of a correspondence table for a sheet size and a scan image size according to an exemplary embodiment.

FIG. 9 illustrates an example of a weighting coefficient table used in arrangement setting according to an exemplary embodiment.

FIGS. 11A to 11C illustrate examples of overall processing related to size adjustment processing according to an exemplary embodiment.

DESCRIPTION OF THE EMBODIMENTS

Figure 2:
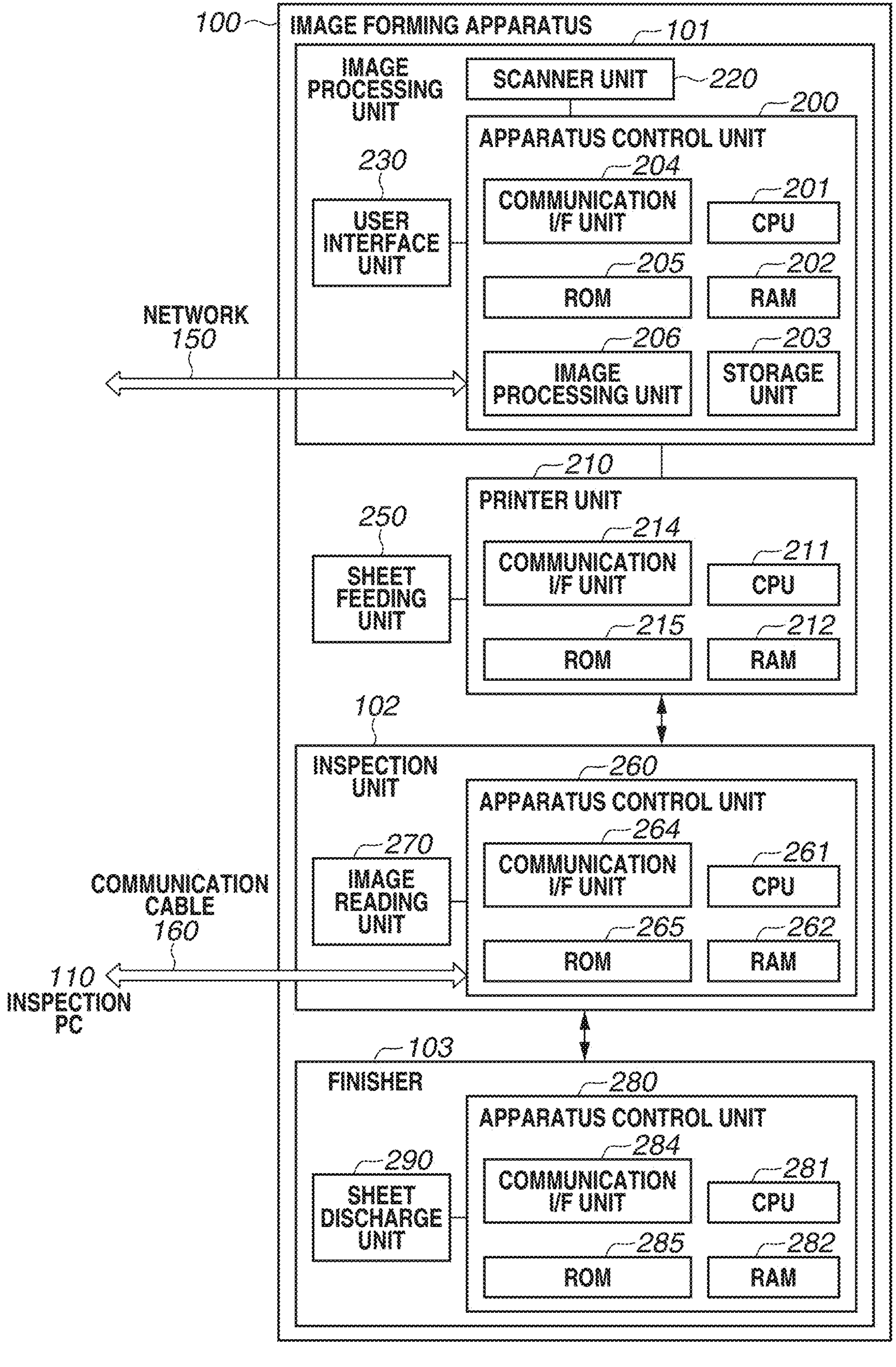
FIG. 2 illustrates an internal configuration of an image forming apparatus according to an exemplary embodiment.

The size of a generated correct answer image does not necessarily coincide with the size of a scan image on a print product which is a result of printing print data in a print region because the scan image includes a non-print region. For this reason, such size mismatching causes an inspection failure.

For example, an image obtained by subjecting print data to Raster Image Processor (RIP) processing is image data generated in accordance with a region, within the print sheet size, in which print is performed. Meanwhile, a print product obtained by printing of image data with a printer includes not only a region on which printing is performed but also a margin where printing is not performed by the printer. An inspection target image obtained by scanning the print product is image data of the entire sheet including the margin. Thus, the size of the read inspection target data does not coincide with the size of the image data obtained through the RIP processing.

Embodiments of the present disclosure have been embodied in view of at least part of the above-described issues. Embodiments of the present disclosure are directed to enabling print image inspection by matching the size of image data obtained through RIP processing with the size of image data obtained through scanning.

Exemplary embodiments of the present disclosure will be described below with reference to the accompanying drawings. Components described in the following exemplary embodiments are to be considered as illustrative and not restrictive on the scope of the present disclosure. Not all of the combinations of the features described in the exemplary embodiments are indispensable to the solutions for the present disclosure.

A first exemplary embodiment of the present disclosure will be described below. FIG. 1 illustrates an overall configuration of a system having an inspection function according to an exemplary embodiment of the present disclosure.

The present system includes an image forming apparatus 100, an inspection personal computer (PC) (inspection apparatus) 110, a client PC 120, a printer server (image processing apparatus) 140, a network 150, and a communication cable 160.

The image forming apparatus 100 prints out a print product based on various types of input data, for example, print data transmitted from the client PC 120 and the printer server 140. The image forming apparatus 100 includes an image processing unit 101, an inspection unit 102, and a finisher 103, and is connected to the image processing unit 101, the inspection unit 102, and the finisher 103 via a communication cable serving as an internal bus.

The image processing unit 101 subjects various input data to image processing according to print settings and outputs the image-processed image as a print product.

The inspection unit 102 receives the print product output from the image processing unit 101 and reads the print product to acquire image data. The inspection unit 102 transfers the obtained image data to the inspection PC 110 (described below) via a communication cable 160. The inspection PC 110 performs an inspection to determine whether the print product includes a defective image. The inspection unit 102 acquires the inspection result from the inspection PC 110.

The finisher 103 receives an output sheet inspected by the inspection unit 102, changes the sheet discharge destination based on a result of inspection performed by the inspection PC 110, and performs post-processing (such as bookbinding) as appropriate.

The image forming apparatus 100 is connected to the inspection PC 110, the client PC 120, and the printer server 140 via a network 150. The image forming apparatus 100 is connected to the inspection PC 110 to communicate image data for inspection and inspection results via the communication cable 160. While in the present exemplary embodiment, the inspection is performed using the inspection PC 110, the present exemplary embodiment is not limited thereto. An in-line inspection apparatus that integrally performs image forming, inspection, post-processing, and sheet discharge is also applicable. The configuration of the image forming apparatus 100 according to the present exemplary embodiment will be described in detail below.

The inspection PC 110 is used for inspecting an image read from a print product using the inspection unit 102. The inspection PC 110 inspects a print product by determining whether the image data received from the inspection unit 102 includes a defective image. Here, defective images mean images that degrade the quality of the print product. Examples of defective images include a round-shaped defective image (dots) resulting from a coloring material adhering to an unintended portion during printing, missing color resulting from an insufficient amount of the coloring material adhering to intended portions, and a linear defective image (streaks).

The inspection PC 110 includes an apparatus control unit 111 and a user interface 118 (hereinafter referred to as a User Interface (UI) unit). The apparatus control unit 111 includes a controller board that mounts a Central Processing Unit (CPU) 112, a Random Access Memory (RAM) 113, a Read Only Memory (ROM) 114, a communication interface (I/F) unit 115, a storage unit 116, an inspection processing unit 117, and an image processing unit 119. According to the present exemplary embodiment, different modules communicate with each other via an internal system bus (not illustrated).

The CPU 112 reads a main program from the storage unit 116 according to the initial program in the storage unit 116 and then stores the program in the RAM 113. The RAM 113 is used to store programs and used as a working main memory. The ROM 114 is used to temporarily store data generated during program processing. The communication I/F unit 115 is used to perform communication via the network 150 and the communication cable 160. The storage unit 116 is used to store data such as programs and large-capacity data such as image data. The inspection processing unit 117 calculates a differential value between a correct answer image stored in the RAM 113 and an inspection target scan image, to inspect the image data obtained by the inspection unit 102 for stains, missing color, and/or other defective images. Then, for each pixel, the inspection processing unit 117 compares the differential value obtained through the calculation with inspection threshold values (contrast and size) for each inspection item. The result of the inspection is stored in the RAM 113. For example, the inspection processing unit 117 stores information about whether a print product includes a defective image and positional information for the detected defective image for display of the type of the defective image (dots and/or streaks) on the UI unit 118. The inspection processing unit 117 transmits the inspection result to the inspection unit 102 via the communication cable 160. The image processing unit 119 subjects the image data stored in the RAM 113 to processing to be performed for inspection of the image. Examples of such processing include trimming processing for clipping an image to adjust the image size and white pixel addition processing for increasing the image size.

The UI unit 118 includes, for example, a keyboard, mouse, display, and other input/output (I/O) devices, allowing input of various setting values and specified values.

The client PC 120 is connected to the inspection PC 110 and the printer server 140 via the network 150 and includes an apparatus control unit 121 and a UI unit 128. The client PC 120 is used to operate the inspection PC 110 and the printer server 140. The apparatus control unit 121 includes a controller board, and mounts thereon a CPU 122, a RAM 123, a ROM 124, a communication I/F unit 125, and a storage unit 126. The roles of these apparatuses in the client PC 120 are similar to those of the apparatuses in the inspection PC 110, and redundant descriptions thereof will be omitted.

The printer server 140 is used not only to perform the RIP processing for printing the print and document data but also to control printing of the image forming apparatus 110 and manage a print job. The printer server 140 includes an apparatus control unit 141 and a UI 148. Moreover, the apparatus control unit 141 includes a controller board and mounts thereon a CPU 142, a RAM 143, a ROM 144, a communication I/F unit 145, a storage unit 146, and an image processing unit 147. The roles of these apparatuses in the printer server 140 are similar to those of the apparatuses in the inspection PC 110 except for the image processing unit 137, and redundant descriptions thereof will be omitted.

The image processing unit 147 subjects the print and document data transmitted from the client PC 120 to the RIP processing for printing the data in accordance with the print settings to convert the data into bitmap image data. According to the present exemplary embodiment, the image data generated through the RIP processing is referred to as a RIP image or RIP data. Specific RIP processing for printing includes processing for trimming the image data and adding white pixels in accordance with the print sheet size set in the print settings, and processing for generating an image without lowering a resolution of 600 dots per inch (dpi). The image processing unit 147 also performs the RIP processing for generating a correct answer image for the inspection to be registered in the inspection PC 110.

The foregoing is the description of the overall system configuration including the inspection apparatus according to the exemplary embodiment of the present disclosure.

The image forming apparatus 100, the inspection PC 110, the client PC 120, and the printer server 140 are mutually communicable with each other via the network 150. The present exemplary embodiment is not limited thereto but may be implemented in network connections between different apparatuses.

[Configuration of Image Forming Apparatus]

FIG. 2 illustrates an internal configuration of the image forming apparatus 100 according to the present exemplary embodiment.

The image forming apparatus 100 includes the image processing unit 101, the inspection unit 102, and the finisher 103. The image processing unit 101 includes an apparatus control unit 200, a printer unit 210, a scanner unit 220, a UI unit 230, and a sheet feeding unit 250.

The apparatus control unit 200 receives an image and a document from the network 150 and converts it into print data. The apparatus control unit 200 includes a CPU 201, a RAM 202, a storage unit 203, a communication I/F unit 204, a ROM 205, and an image processing unit 206. The roles of these apparatuses are similar to those of the apparatuses in the printer server 140, and redundant descriptions thereof will be omitted.

The image processing unit 206 acquires Page Description Language (PDL) data stored in the RAM 202 and performs image processing for converting the data into print data. The image processing for converting the PDL data into print data refers to, for example, subjecting the PDL data to the RIP processing to convert the data into multi-valued bitmap data and subjecting the data to pseudo halftone processing, such as screen processing, to convert the data into binary bitmap data. The binary bitmap data obtained by the image processing unit 206 is transmitted to the printer unit 210 via the communication I/F unit 204.

The printer unit 210 conveys a sheet from the sheet feeding unit 250, receives the binary bitmap data generated by the apparatus control unit 200, and prints the data on the sheet by using a coloring material. At this time, the printer unit 210 issues an instruction to the printer unit 210 based on the print settings specified by the user. For example, for the print settings based on coated paper, a CPU 211 issues an instruction to perform printing using a sheet cassette (not illustrated) storing coated paper in the sheet feeding unit 250. The apparatus control unit 200 and the printer unit 210 control various processing ranging from the reception of the above-described PDL data to the printing on a sheet, thus forming a full-color toner image on a sheet. The printer unit 210 includes the CPU 211, the RAM 212, the communication I/F unit 214, and the ROM 215. The roles of these apparatuses are similar to those of the apparatuses in the apparatus control unit 200, and redundant descriptions thereof will be omitted.

The scanner unit 220 irradiates a document image with light from a light source (not illustrated), reads a document reflection image through a lens, and obtains read signals from, for example, a charge coupled device (CCD) sensor as multi-valued (red, green, and blue) image data.

The UI unit 230 includes, for example, a keyboard, a mouse, a display, and other input/output apparatuses, allowing input of various setting values and specified values.

The sheet feeding unit 250 includes one or more cassettes for setting print sheets, supplies a sheet from the cassette corresponding to the sheet size specified in the print settings, and conveys the sheet to the printer unit 210.

The inspection unit 102 includes an apparatus control unit 260 and an image reading unit 270.

The image reading unit 270 reads a print product conveyed from the image processing unit 101. The image reading unit 270 irradiates a document as a print product with light from a light source (not illustrated), reads a reflection image of the document through a direct coupling lens, and obtains read information from a Contact Image Sensor (CIS), as multi-valued (red, green, and blue) image data. The image reading unit 270 according to the present exemplary embodiment is not limited to a CIS sensor. A CCD sensor may be used to obtain image data.

The apparatus control unit 260 performs control to transfer the image data obtained by the image reading unit 270 to the inspection PC 110 (described below) via the communication cable 160. The apparatus control unit 260 instructs the inspection PC 110 to inspect the print product for a defective image, acquires the inspection result from the inspection PC, and transmits the result to the finisher 103. The apparatus control unit 260 includes a CPU 261, a RAM 262, a communication I/F unit 264, and a ROM 265.

The roles of these apparatuses are similar to those of the apparatuses in the apparatus control unit 200, and redundant descriptions thereof will be omitted.

The finisher 103 includes an apparatus control unit 280 and a discharge unit 290.

The apparatus control unit 280 determines the discharge control to be performed by the discharge unit 290 based on the print settings and the inspection result. The apparatus control unit 280 includes a CPU 281, a RAM 282, a communication I/F unit 284, and a ROM 285. The roles of these apparatuses are similar to those of the apparatuses in the apparatus control unit 200, and redundant descriptions thereof will be omitted.

The discharge unit 290 subjects the print product conveyed from the inspection unit 102 to post-processing (such as bookbinding) in accordance with the print settings and/or changes the discharge destination based on the inspection result. For example, the finisher 103 may change the discharge destination depending on whether a print product includes a defective image based on the inspection result received from the inspection unit 102. In this case, the finisher 103 discharges a print product with no defective image to the regular discharge tray and discharges a print product including a defective image to a discharge tray different from the regular discharge tray.

The foregoing is the description of the image forming apparatus 100 according to the exemplary embodiment of the present disclosure. The present exemplary embodiment is not limited thereto as long as the image forming apparatus 100 is capable of reading an image for inspecting whether a print product as a result of printing the print data includes a defective image.

[Overview of Inspection System]

An overview of an inspection system according to the present exemplary embodiment will now be described below.

Initially, when the user performs a print setting operation for a job to be inspected using the client PC 120, a correct answer image is registered in the inspection PC 110. Herein, the correct answer image refers to an image having been subjected to the RIP processing on a server specialized for image processing, and serves as a reference image in the inspection. In response to the correct answer image having been registered, the user operates the inspection PC 110 to make an inspection setting for the correct answer image. In the inspection setting operation, the user sets an inspection target region and the level of a detection target stain. The foregoing is the brief description of processing for registering a correct answer image.

After the correct answer image has been registered, an inspection is subsequently performed. In response to receiving a print execution instruction from the client PC, the server specialized for image processing subjects the document data to the RIP processing, and the image processing unit 101 of the image forming apparatus 100 prints a document on a recording sheet. The printed print product is conveyed from the image processing unit 101 to the finisher 103 via the inspection unit 102. The print product is scanned by the inspection unit 102 during transportation, thus obtaining a scan image which is then transmitted from the image forming apparatus 100 to the inspection PC 110. The inspection PC 110 compares the scan image with the pre-registered correct answer image to determine whether the inspection result is successful or failed. The determination of the result is performed until the print product is conveyed to the finisher 103. The print product with a failed inspection result is distinguished from the print product with a successful inspection result and then discharged.

The image processing apparatus 140 that performs the RIP processing at the time of the correct answer image registration may be the same as or different from the image processing apparatus 140 that performs the RIP processing at the time of printing. The former case will be described below as a first exemplary embodiment and the latter case will be described below as a third exemplary embodiment.

[Correct Answer Image Processing by Inspection System]

Figure 3A:
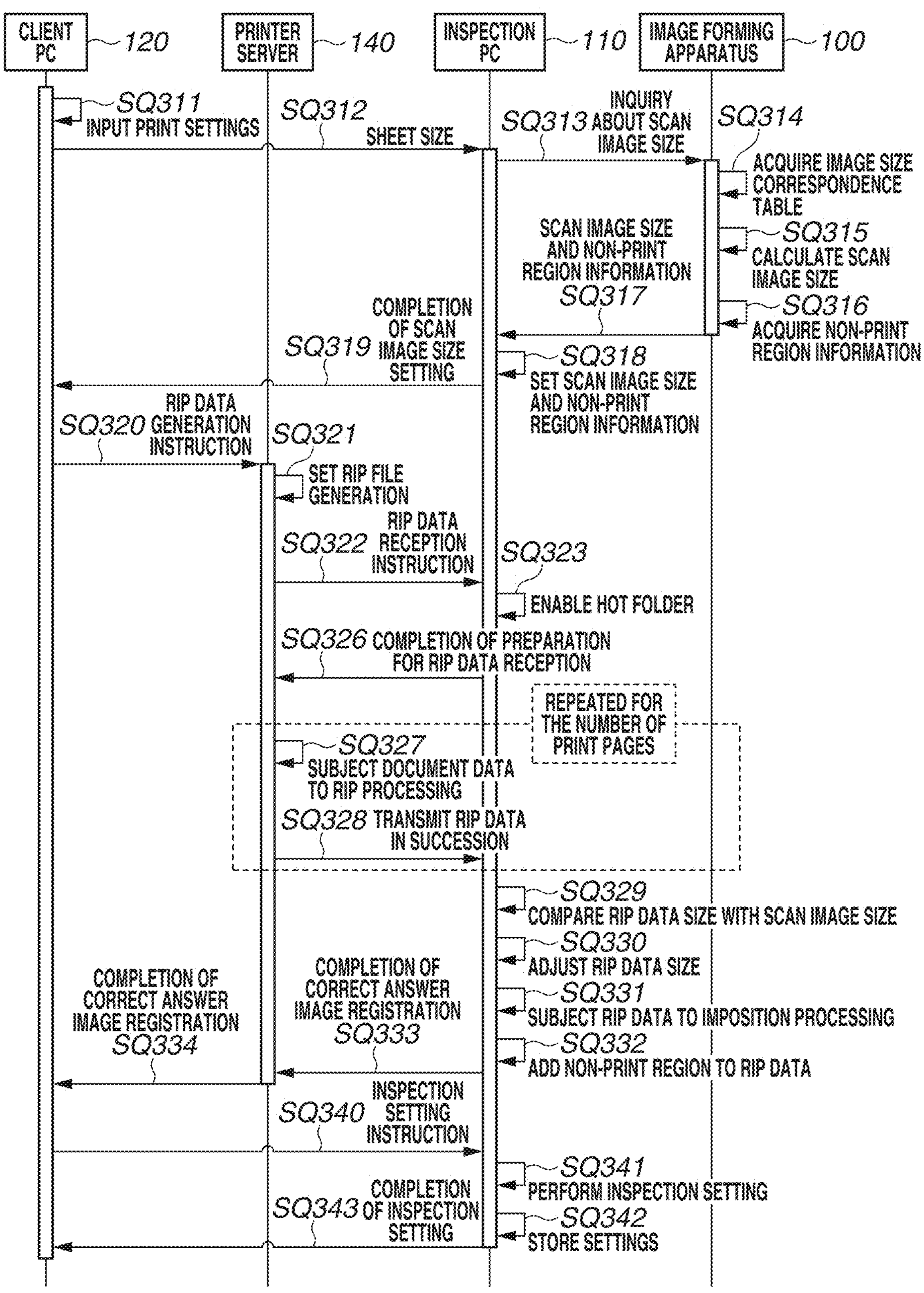
FIG. 3A is a sequence diagram illustrating correct answer image registration processing according to an exemplary embodiment.

FIG. 3A is a sequence diagram illustrating processing in which the user registers a correct answer image before the inspection in the inspection system. In this processing, the printer server 140 subjects the print data to the RIP processing to generate image data and then arranges the generated image data in order of printing to be inspected.

Performing these pieces of processing completes the registration of the correct answer image and inspection settings performed before the inspection of a print product.

In response to receiving an instruction from a user, the client PC 120, the printer server 140, the inspection PC 110, and the image forming apparatus 100 perform the processing in FIG. 3A (described below). The client PC 120 performs this processing in response to receiving an instruction to start the correct answer image registration from the user.

The following processing of the inspection PC 110 is implemented when a program code stored in the storage unit 116 is loaded into the RAM 113, and the apparatus control unit 111 is controlled by the CPU 112. The following processing of the client PC 120 is implemented when a program code stored in the storage unit 126 is loaded into the RAM 123, and the apparatus control unit 121 is controlled by the CPU 122. The following processing of the image forming apparatus 100 is implemented when a program code stored in the storage unit 203 is loaded into the RAM 202, and the apparatus control unit 200 is controlled by the CPU 201.

Figure 6:
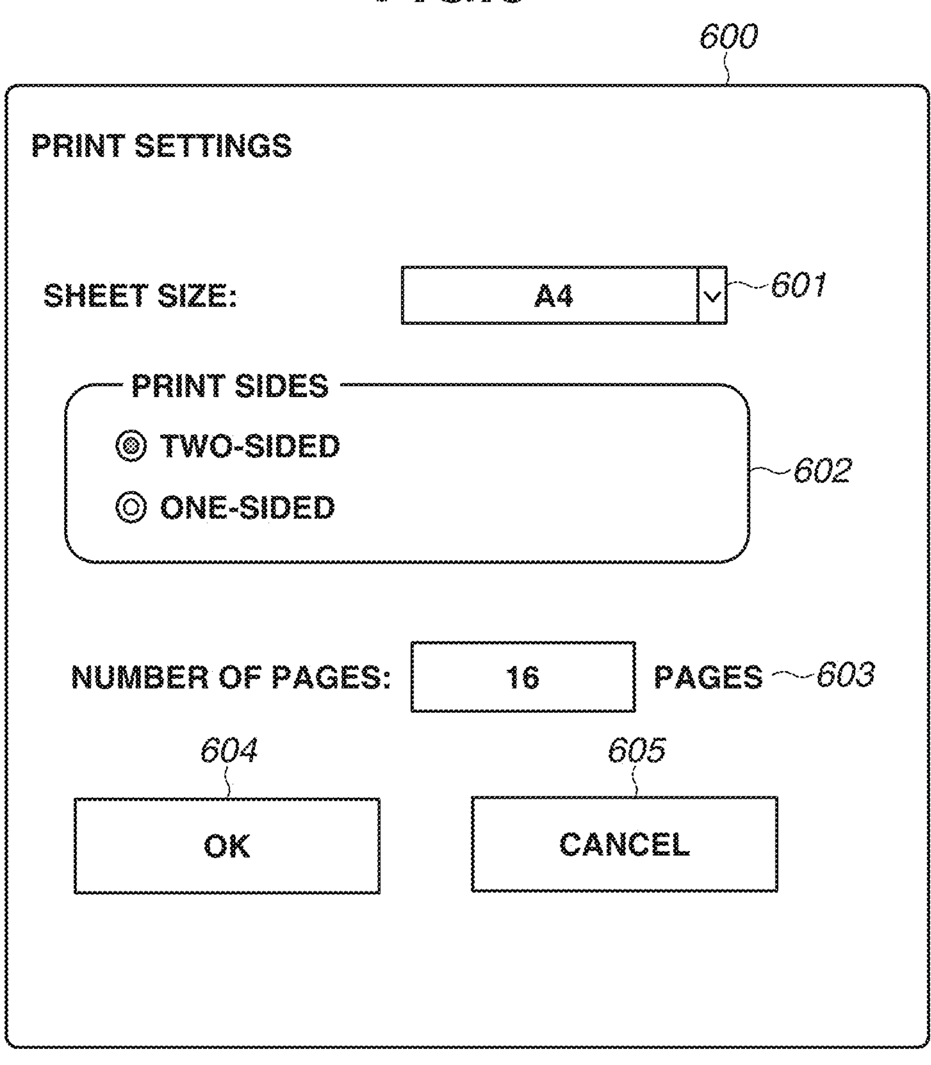
FIG. 6 illustrates an example of a UI screen for print settings according to a first exemplary embodiment.

In step SQ311, the client PC 120 receives a print setting instruction in accordance with the screen illustrated in FIG. 6 from the user. The acquired information about the print settings is used not only for the correct answer image registration described in this processing but also for actual print processing to be subjected to the inspection processing.

FIG. 6 illustrates an example of a UI for setting print information. A UI 600 in FIG. 6 is used to input print settings related to the inspection processing, and displayed on the UI unit 128 of the client PC 120.

A list box 601 is selected by the user to set the sheet size to be used in printing and inspection. Examples of selectable sheets according to the present exemplary embodiment include fixed-size sheets having a sheet size printable by the image forming apparatus 100 and non-fixed-size sheets that can be specified by the user. If a non-fixed-size sheet is selected, the user separately inputs the vertical and horizontal sizes.

Radio buttons 602 are pressed by the user to select two-sided or one-sided.

A text box 603 is used for the user to input a total number of pages of the document data to set. The printer server 140 repeats the operations in steps SQ327 and SQ328 (described below) for the number of print pages set in the text box 603. The text box 603 may be configured to be automatically input.

A button 604 is pressed by the user to store the set setting values. A button 605 is pressed by the user to cancel the print setting operation. If the user presses the button 605, the information currently set is canceled.

The foregoing is the description of the UI for the print setting operation.

In step SQ312, the client PC 120 notifies the user of the sheet size set to the inspection PC 110 in step SQ311.

In step SQ313, the inspection PC 110 inquires of the image forming apparatus 100 about the scan image data size corresponding to the set sheet size. Here, the scan image size refers to a scan image to be generated by the image forming apparatus 100 reading a print product at the time of execution of the subsequent inspection.

In step SQ314, the image forming apparatus 100 acquires a sheet size correspondence table for acquiring the scan image data size.

FIG. 7 illustrates an example of the correspondence table for the sheet size and the scan image size according to the present exemplary embodiment. The sheet size correspondence table is obtained from the storage unit 203 by the apparatus control unit 200 in response to receiving information about the scan image data size in step SQ313. The sheet size correspondence table is stored in at least either one of the storage unit 203 of the image forming apparatus 100 and the storage unit 116 of the inspection PC 110. FIG. 7 illustrates a look up table (LUT) representing the relation between the sheet size for which an input value has been set and the numbers of pixels of the scan image size in the main and the sub scanning directions corresponding to the input value. The scan image size refers to the size from the top edge to the bottom edge of the sheet to be read by the image reading unit 270. For example, the scan image data of the sheet size A5 in the print settings is used for the conversion to scan image data having a size of 4,961 pixels in the main scanning direction and a size of 3,496 pixels in the sub scanning direction.

In step SQ315, the image forming apparatus 100 determines the size of the print product, or the scan image size, based on the sheet size specified by the user by using the sheet size correspondence table obtained in step SQ314.

If a non-fixed sheet size is set in step SQ311, the scan image size is calculated by adding predetermined numbers of pixels, which are stored in advance, to the numbers of pixels in the main and the sub scanning directions. The present exemplary embodiment is not limited thereto but any desired method is applicable as long as the scan image size is calculatable based on the set sheet size. While the size of a print product according to the present exemplary embodiment is based on the size with a resolution of 600 dpi, the resolution is not limited thereto. If the resolution is not 600 dpi or if the resolutions in the main and the sub scanning directions are different, the number of pixels corresponding to the relevant resolution is applied.

In step SQ316, the image forming apparatus 100 acquires information about the non-print region where no image is printed at the time of printing. For the image forming apparatus 100, the lengths and the numbers of pixels of the non-print region in the main and the sub scanning directions are preset and stored in the storage unit 203, in the present exemplary embodiment. According to the present exemplary embodiment, the number of pixels outside the sheet region is based on a resolution of 600 dpi. However, if the resolution is not 600 dpi or if the resolutions in the main and the sub scanning directions are different, the number of pixels corresponding to the relevant resolution is applied. According to the present exemplary embodiment, the length of the non-print region is fixed regardless of the sheet size and print settings. However, the length of the non-print region corresponding to the sheet size and print settings may be set.

In step SQ317, the image forming apparatus 100 notifies the inspection PC 110 of the scan image size calculated in step SQ315 and the non-print region information obtained in SQ316.

In step SQ318, the inspection PC 110 stores as the scan image size the sheet size of the print product notified of in step SQ317, and also stores the non-print region information. The stored scan image size and non-print region information are used for size comparison processing in step SQ329 and size adjustment processing in step SQ330 (described below). While in the present exemplary embodiment is described to acquire the scan image size and the non-print region information from the image forming apparatus 100 each time a correct answer image is registered, this is not restrictive. The present exemplary embodiment may be configured such that a correspondence table equivalent to one illustrated in FIG. 7 and non-print region information specific to the image forming apparatus 100 may be registered in advance in the inspection PC 110. In such a case, the operations in steps SQ313 to SQ317 are skipped, then in step SQ318, the inspection PC 110 acquires the scan image size equivalent to the sheet size information notified of in step SQ312 and the non-print region information.

In step SQ319, the inspection PC 110 notifies the client PC 120 of the acquisition of the scan image size and the completion of the print setting operation.

In step SQ320, the client PC 120 instructs the printer server 140 to perform the processing for registering the correct answer image. More specifically, the client PC 120 instructs the printer server 140 to generate RIP data based on the document data and transfer the data to the inspection PC 110. According to the present exemplary embodiment, the document data serving as the original data for RIP data generation is transmitted from the client PC 120 to the printer server 140 at this time.

In step SQ321, the printer server 140 sets files to be generated in the RIP processing.

Figure 10:
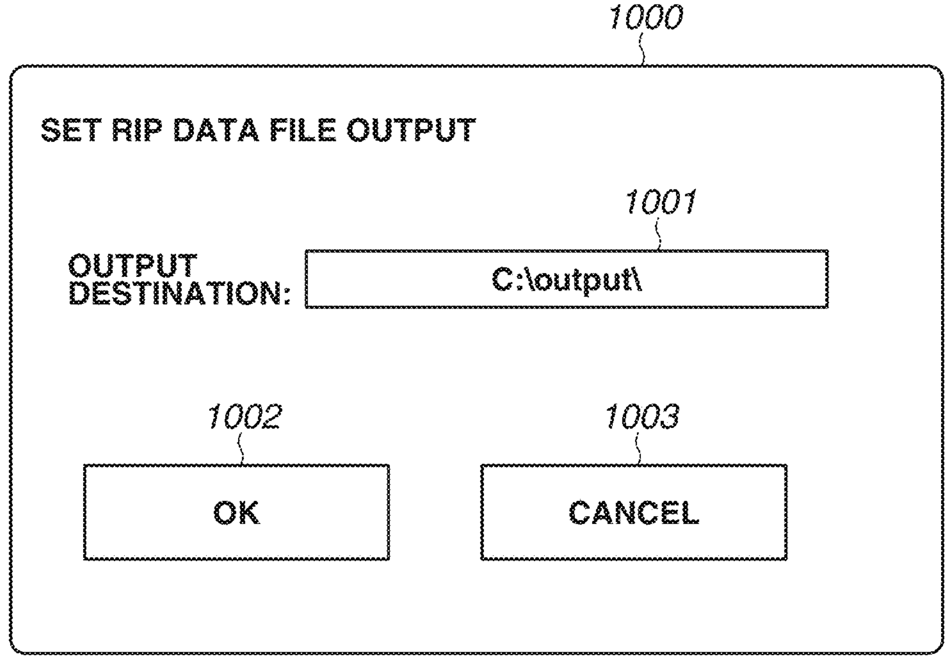
FIG. 10 illustrates an example of a UI screen for setting a Raster Image Processor (RIP) file according to an exemplary embodiment.

FIG. 10 illustrates an example of a UI for setting page information for the document data to be subjected to the RIP processing. The UI is displayed on the UI unit 138 of the printer server 140.

A text box 1001 is used to set a folder path as the output destination of the RIP data to be generated. While the present exemplary embodiment assumes a direct input to the text box 1001 using a keyboard, an output destination folder may be selected from a displayed dialog. Furthermore, a folder outside an inspection purpose RIP server 130, such as one in the inspection PC 110, may be set as the output destination as in the present exemplary embodiment.

A button 1002 indicates the completion of the setting operation for the output of a RIP data file. If the user presses the button 1002, setting values set in a screen 1000 are stored. A button 1003 is pressed by the user to cancel the setting regarding the output of a RIP data file. If the user presses the button 1003, the information currently set is canceled and the dialog closes.

The foregoing is the description of the UI for setting information about files to be generated in the RIP processing according to the present exemplary embodiment.

In step SQ322, the printer server 140 instructs the inspection PC 110 to prepare to receive RIP data to be transferred from the client PC 120.

In this case, the printer server 140 transmits, to the inspection PC 110, settings of an order rule for generation of files in the RIP processing set in step SQ321.

In step SQ323, the inspection PC 110 enables a hot folder with the output destination setting for the RIP file set in step SQ321 being set to a monitoring target. According to the present exemplary embodiment, the setting of the text box 1001 is used as the output destination setting for the RIP file. The inspection PC 110 checks whether a file transfer event occurs in the hot folder set to the monitoring target, and, as soon as the RIP data transfer is completed, performs an operation in step SQ329 (described below).

In step SQ326, the inspection PC 110 notifies the printer server 140 of the completion of a series of operations for receiving the RIP data.

In step SQ327, the printer server 140 performs the RIP processing for each page to generate RIP data based on the document data received from the client PC 120 in step SQ320 and the information about the print settings set in step SQ311. The RIP processing performed in this case is similar to RIP processing to be performed in step SQ411 (described below).

In step SQ328, as soon as the RIP data is generated in step SQ327 for each page, the printer server 140 successively transfers the data to the hot folder as the monitoring target in the inspection PC 110. The printer server 140 repeats the operations in steps SQ327 and SQ328 for the number of print pages of the document data.

According to the present exemplary embodiment, if different RIP data is transferred during the repetitive processing, the data is used for the processing for the last received RIP data and the subsequent processing. However, any one of duplicated files may be used. If the received RIP data has a different vertical and/or horizontal size of the image data and/or a different file name from that/those of the initially received RIP data, the RIP data is not received. If the received RIP data has a different vertical and/or horizontal size of the image data and/or a different file name, different document data may have been subjected to the RIP processing in a mixed state.

Omitting to process the RIP data having a different format enables preventing different document data from being inspected in a mixed state.

In step SQ329, the inspection PC 110 performs a size comparison in the main and the sub scanning directions based on the RIP data size transferred in up to step SQ328 and the scan image size for the sheet size and the number of pixels in the non-print region obtained in step SQ317. More specifically, for the main scanning direction, the inspection PC 110 calculates a differential value of the total number of pixels in the non-print region from the RIP data size and the scan image size in the main scanning direction to obtain the size of the print region in the scan image in the main scanning direction. Then, the inspection PC 110 compares the calculated size of the print region of the scan image with the number of pixels of the RIP data in the main scanning direction. Similarly, for the sub scanning direction, the inspection PC 110 calculates a differential value of the total number of pixels in the non-print region from the scan image size in the sub scanning direction to obtain the size of the print region of the scan image in the sub scanning direction. Then, the inspection PC 110 compares the calculated size of the print region of the scan image with the number of pixels of the RIP data in the sub scanning direction.

In step SQ331, the image processing unit 119 of the inspection PC 110 subjects the RIP data having been subjected to the size adjustment in step SQ330 to imposition processing. The imposition processing according to the present exemplary embodiment refers to processing of changing the order of printing the RIP data and rotation processing on the RIP data depending on a print finishing method.

In step SQ332, the image processing unit 119 of the inspection PC 110 adds white pixels to the RIP data having been subjected to the imposition processing in step SQ331 based on the non-print region information obtained in step SQ316 to generates a correct answer image.

FIG. 11C illustrates an example in which white pixels are added in the main and the sub scanning directions to generate correct answer image data 1105 from imposition-processed RIP data 1106. The image processing unit 119 sets h5, h6, w5, and w6 and adds white pixels in the vertical and horizontal directions based on the non-print region information obtained in step SQ316.

Thus, the correct answer image data generated in step SQ332 has the same size as that of the scan image data.

In step SQ333, the inspection PC 110 generates a correct answer image from the RIP data through the operations up to step SQ332 and notifies the printer server 140 of the completion of the correct answer image registration. In response to receiving the notification in SQ333, then in step SQ334, the printer server 140 generates a correct answer image and notifies the client PC 120 of the completion of the correct answer image registration.

In step SQ340, the client PC 120 instructs the inspection PC 110 to perform the inspection settings for inspection.

In step SQ341, the inspection PC 110 sets various inspection parameters, such as the inspection region and the inspection level according to the inspection settings of the user. A UI used to perform the inspection setting in step SQ341 according to the present exemplary embodiment will be described in detail below.

In step SQ342, the inspection PC 110 completes the inspection setting operation in step SQ341 and stores various inspection parameters such as the inspection region and the inspection level so that inspection is made performable.

In step SQ343, the inspection PC 110 notifies the client PC 120 of the completion of the inspection setting operation. Thus, the user is notified of the completion of a series of operations for registering a correct answer image and inspection settings.

The foregoing is the description of the processing of registering a correct answer image and inspection settings before inspection is performed, according to the present exemplary embodiment.

An example of the UI related to the inspection setting in step SQ341 will be described below with reference to FIG. 5.

Figure 5:
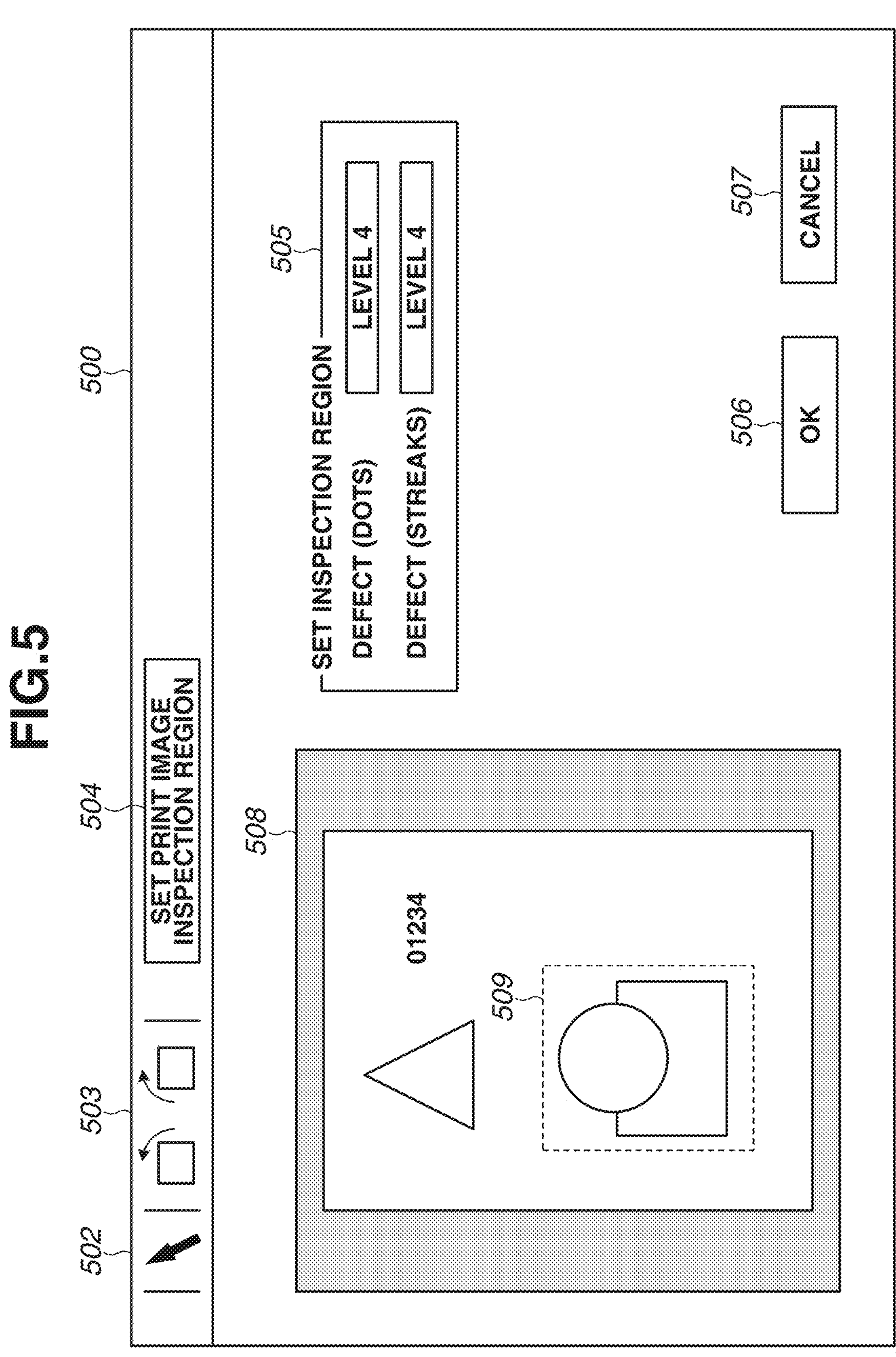
FIG. 5 illustrates an example of a User Interface (UI) screen related to inspection settings according to an exemplary embodiment.

A UI 500 in FIG. 5 is displayed on the UI unit 118 of the inspection PC 110 at the timing of the inspection setting in step SQ341. A button 502 serves as an inspection region selection button, is pressed by the user to change the setting information regarding the inspection area having been set. A button 503 is used to rotate the image displayed in a page preview 508. The page preview 508 is a display screen for displaying the correct answer image having been subjected to the imposition processing in step SQ332.

A button 504 is pressed by the user to set a region to be subjected to a print image inspection. A method for setting a region to be subjected to a print image inspection according to the present exemplary embodiment will be described below.

Initially, the user presses a button 504 indicating "Set Print Image Inspection Region". The user then operates to specify a range to be subjected to the print image inspection in a page preview 508, the inspection PC 110 sets the corresponding specified range to a print image inspection region 509. The print image inspection region 509 is an inspection region to be subjected to detection of a defective image on a print product.

A UI 505 is a UI group for setting the level of a defective image to be detected in performing a print image inspection. The user sets detection items and their detection levels for detecting a defective image in the print image inspection. The detection items for the print image inspection are items related to the features of a defective image to be detected in the print product inspection. Examples of detection items include a round-shaped defective image (dots) and a linear defective image (streaks). The detection level refers to a parameter that is set on a level basis based on which whether each feature of a detected defective image is a defective image is determined depending on its size. For example, the detection level includes five different inspection levels, specifically, Levels 1 to 5. Level 5 enables detecting a more faint and smaller defective image than with Level 1. The detection level can be set for each inspection item, for example, inspection Level 5 for dots and inspection Level 4 for streaks. The UI 505 indicates that the user selects Level 4 as the inspection level setting for a defective image (dots), and Level 4 as the inspection level setting for a defective image (streaks).

A button 506 is used to store the inspection settings performed in step SQ342 after all of the inspection settings are made. A button 507 is used to cancel the inspection setting. If the user presses the button 507, the setting information is canceled and the inspection setting is terminated.

The foregoing is the description of the UI related to the inspection setting performed in step SQ341 according to the present exemplary embodiment. Even after the inspection setting in FIG. 5 is completed, the user is able to call and adjust the inspection settings again.

[Correct Answer Image Registration Processing of Inspection PC]

Figure 3B:
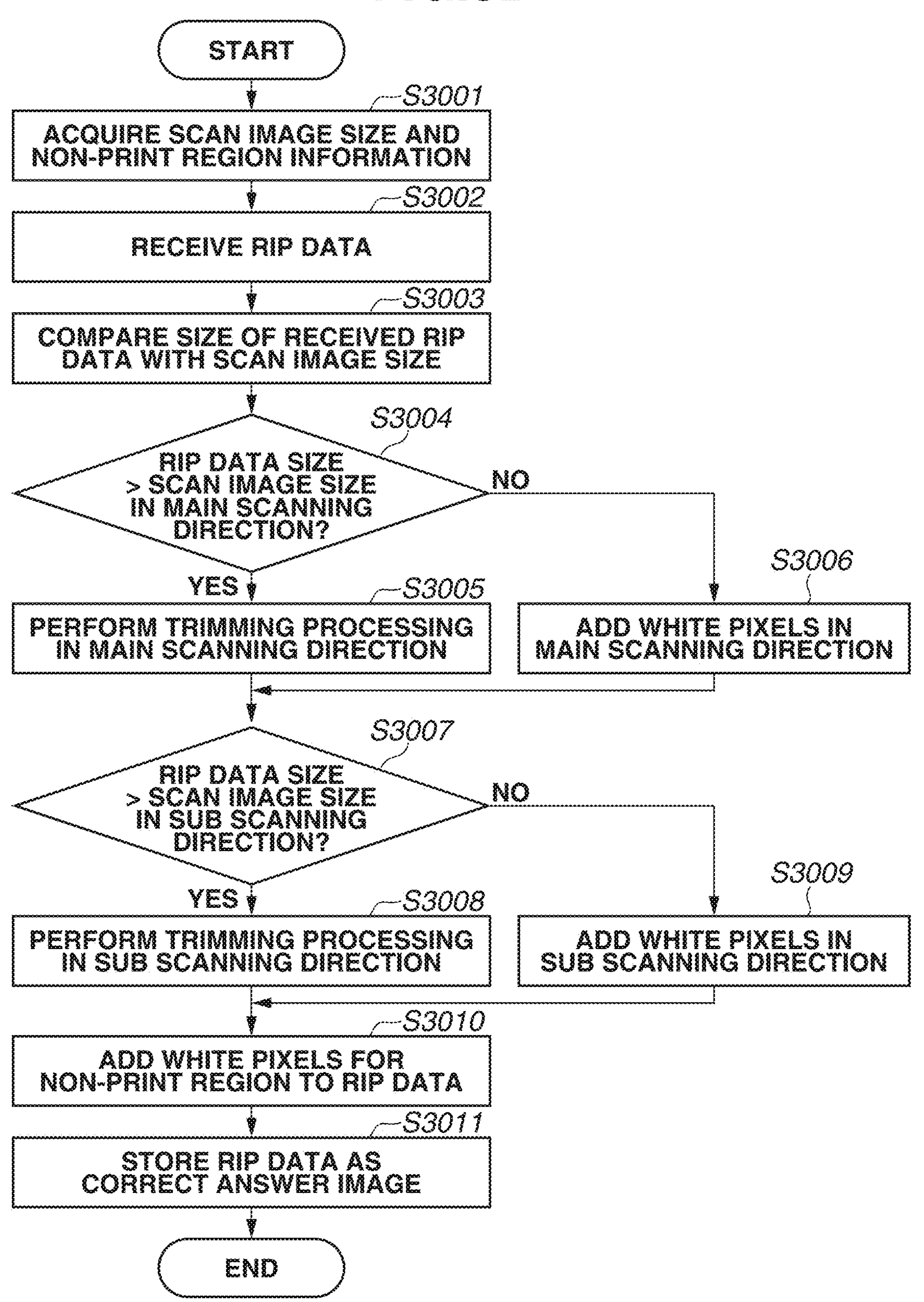
FIG. 3B is a flowchart illustrating the correct answer image registration processing according to an exemplary embodiment.

FIG. 3B is a flowchart illustrating processing of registering a correct answer image focusing on the inspection PC 110 out of processing of registering a correct answer image performed in the inspection system in FIG. 3A.

The processing of the inspection PC 110 is implemented when a program code stored in the storage unit 116 is loaded into the RAM 113, and the apparatus control unit 111 is controlled by the CPU 112.

In step S3001, the inspection PC 110 acquires the scan image size and non-print region information. These pieces of information may be received from the image forming apparatus 100 or acquired based on the correspondence table illustrated in FIG. 7.

In step S3002, the inspection PC 110 receives the RIP data. The RIP data indicates a document having been subjected to the RIP processing by the inspection purpose RIP server 130 or the printer server 140.

In step S3003, the inspection PC 110 ready for performing the size comparison in the main and the sub scanning directions based on the size of the RIP data received in step S3002 and the scan image size and the non-print region information obtained in step S3001.

In step S3004, the inspection PC 110 compares the RIP data size in the main scanning direction with the scan image data size in the main scanning direction, which have been compared in step S3003. If the inspection PC 110 determines that the RIP data is larger than the scan image data (YES in step S3004), the processing proceeds to step S3005. In step S3005, the image processing unit 119 of the inspection PC 110 subjects the RIP data to the trimming processing in the main scanning direction. The trimming processing is similar to the operation described in conjunction with the operation in step SQ329, and a detailed description thereof will be omitted. If the inspection PC 110 determines that the RIP data is smaller than the scan image data (NO in step S3004), the processing proceeds to step S3006. In step S3006, the image processing unit 119 of the inspection PC 110 subjects the RIP data to the white pixel addition processing in the main scanning direction. The white pixel addition processing is similar to that in step SQ329, and a detailed description thereof will be omitted.

In step S3007, the inspection PC 110 compares the RIP data size in the sub scanning direction with the scan image data size in the sub scanning direction, which have been compared in step S3003. If the inspection PC 110 determines that the RIP data is larger than the scan image data (YES in step S3007), the processing proceeds to step S3008. In step S3008, the image processing unit 119 of the inspection PC 110 subjects the RIP data to the trimming processing in the sub scanning direction. The trimming processing is similar to the processing in step SQ329, and a detailed description thereof will be omitted. If the inspection PC 110 determines that the RIP data is smaller than the scan image data (NO in step S3007), the processing proceeds to step S3009. In step S3009, the image processing unit 119 of the inspection PC 110 subjects the RIP data to the white pixel addition processing in the sub scanning direction. The white pixel addition processing is similar to the processing in step SQ329, and a detailed description thereof will be omitted.

In step S3010, the image processing unit 119 of the inspection PC 110 adds white pixels to the RIP data based on the non-print region information obtained in step S3001 to generate a correct answer image. The image processing unit 119 performs the imposition processing before and after addition of white pixels to the RIP data in step S3010.

In step S3011, the inspection PC 110 stores the RIP data having been subjected to the trimming processing and the white pixel addition processing as a correct answer image in the storage unit 116.

The foregoing is the description of the correct answer image registration processing performed by the inspection PC 110 according to the present exemplary embodiment.

[Inspection Execution Processing of Inspection System]

Figure 4:
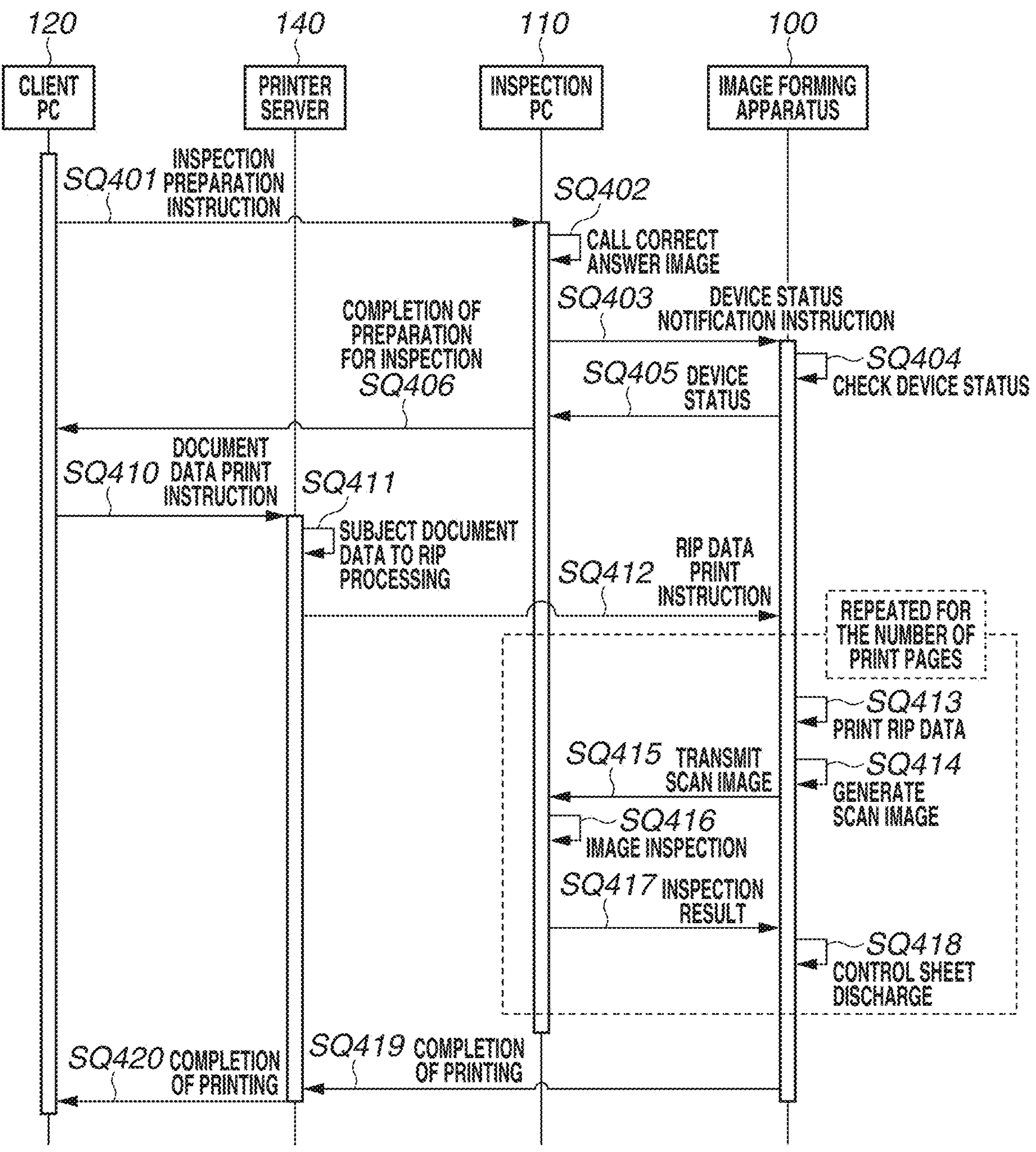
FIG. 4 is a sequence diagram illustrating inspection processing according to an exemplary embodiment.

FIG. 4 is a sequence diagram illustrating inspection execution processing by the inspection system. The inspection execution processing is performed in response to completion of the correct answer image registration processing illustrated in FIGS. 3A and 3B. This processing is performed by the inspection PC 110 to inspect whether the print product printed by the image forming apparatus 100 includes any defect, such as flaws and stains. According to the present exemplary embodiment, a scan image having a defect is referred to as a defective image.

The client PC 120, the printer server 140, the inspection PC 110, and the image forming apparatus 100 perform each operation of processing in FIG. 4 (described below) in response to receiving an instruction from the user.

The client PC 120 performs this processing in response to receiving an instruction using a print and inspection execution button from the user.

The processing of the inspection PC 110 is implemented when a program code stored in the storage unit 116 is loaded into the RAM 113, and the apparatus control unit 111 is controlled by the CPU 112. The processing of the client PC 120 is implemented when a program code stored in the storage unit 126 is loaded into the RAM 123, and the apparatus control unit 121 is controlled by the CPU 122. The processing of the printer server 140 is implemented when a program code stored in the storage unit 146 is loaded into the RAM 143, and the apparatus control unit 141 is controlled by the CPU 142. The processing of the image forming apparatus 100 is implemented when a program code stored in the storage unit 203 is loaded into the RAM 202, and the apparatus control unit 200 is controlled by the CPU 201.

In step SQ401, the client PC 120 instructs the inspection PC 110 to prepare to perform an inspection. The inspection settings set in step SQ341 is used for the inspection.

In step SQ402, the inspection PC 110 acquires the correct answer image having been subjected to the imposition processing in step SQ329 and the inspection settings set in step SQ341.

In step SQ403, the inspection PC 110 instructs the image forming apparatus 100 to issue a notification about whether devices are ready for printing and inspection.

In step SQ404, the image forming apparatus 100 checks whether the image processing unit 101, the inspection PC 110, and the finisher 103 are operable to determine whether the devices are ready for printing and inspection.

In step SQ405, the image forming apparatus 100 issues to the inspection PC 110 a notification about whether the devices are ready for printing and inspection determined in step SQ405.

In step SQ406, the inspection PC 110 notifies the client PC 120 of the completion of the preparation for inspection based on the notification about whether the devices are ready for printing and inspection issued in step SQ405.

In step SQ410, the client PC 120 instructs the printer server 140 to perform printing based on the document data and the print settings specified by the user.

In step SQ411, the printer server 140 performs the RIP processing based on the document data transmitted in step SQ410 and the print settings specified by the user. At this time, the printer server 140 performs size adjustment processing, such as trimming and white pixel addition, to adjust the document data size to the sheet size according to the sheet size specified by the user. According to the present exemplary embodiment, the printer server 140 subjects the document data to the RIP processing before performing the operations in step SQ412 and the subsequent steps.

The RIP processing performed in step SQ411 will be described below with reference to FIGS. 11A to 11C. FIGS. 11A to 11C illustrate examples of overall processing for adjusting the document data size to the sheet size based on the print settings to be performed in the RIP processing of the image processing unit 147 of the printer server 140 according to the present exemplary embodiment.

FIG. 11A illustrates an overview of the trimming processing for adjusting a document data size 1101 to a sheet size 1102 if the document data size 1101 is larger than the sheet size 1102. The trimming in the main scanning direction is evenly performed on only pixels in regions indicated by w1 and w2 such that w1=w2 is obtained. Similarly, the trimming in the sub scanning direction is evenly performed on only pixels within h1 and h2 such that h1=h2 is obtained.

Examples of data to be subjected to the trimming processing include an A4 sheet size setting and a document size with 7,100 pixels in the main scanning direction and 5,000 pixels in the sub scanning direction.

FIG. 11B illustrates an overview of the white pixel addition processing for adjusting a document data size 1103 to a sheet size 1102 if the document data size 1103 is smaller than the sheet size 1102.

The white pixel addition in the main scanning direction is evenly performed on only the pixels in regions indicated by w3 and w4 such that w3=w4 is obtained. Similarly, the white pixel addition in the sub scanning direction is evenly performed on only the pixels in regions indicated by h3 and h4 such that h3=h4 is obtained.

Examples of data to be subjected to the white pixel addition processing include an A4 sheet size setting and a document size with 7,000 pixels in the main scanning direction and 4,900 pixels in the sub scanning direction. If trimming or white pixel addition is required for the odd number of pixels according to the present exemplary embodiment, the number of pixels is incremented by one in a predetermined direction.

The foregoing is the description of an overview of the size adjustment processing performed by the image processing unit 147 of the printer server 140.

In step SQ412, the printer server 140 instructs the image forming apparatus 100 to perform printing based on the RIP data generated in step SQ411 and the print settings specified by the user.

In step SQ413, the printer unit 210 of the image forming apparatus 100 performs printing on each page in accordance with the RIP data received in step SQ412 and the print settings specified by the user.

In step SQ414, the apparatus control unit 260 of the image forming apparatus 100 acquires scan image data obtained by reading the print product printed in step SQ413 via the image reading unit 270.

In step SQ415, the image forming apparatus 100 transmits the scan image data read in step SQ414 to the inspection PC 110 via the communication cable 160.

In step SQ416, the inspection PC 110 inspects whether the scan image data includes any defective image based on the scan image data received in step SQ415 and the imposition-processed correct answer image and the inspection settings read in step SQ402. In this process, the inspection PC 110 stores not only the information about whether the print product includes any defective image but also the type of the detected defective image (dots or streaks) and the scan image of a neighboring region of the region where the defect is detected or the entire page.

In step SQ417, the inspection PC 110 notifies the image forming apparatus 100 of the inspection result in step SQ416 via the communication cable 160.

In step SQ418, the image forming apparatus 100 changes the discharge destination of the finisher 103 based on the inspection result received in step SQ417. For example, a print product with no defective image detected is discharged to the tray of the finisher 103 specified by the user, and a print product with a defective image detected is discharged to the tray for print products with defective images. The present exemplary embodiment is not limited thereto. If a defective image is detected, the defective image may be automatically reprinted to recover the defective image. If reprinting is performed each time a defective image is detected, print products discharged to the tray of the finisher 103 are completed as a set of print products with no defective image.

If printing is completed not for all pages of the document data, the image forming apparatus 100 and the inspection PC 110 repetitively perform printing and inspection from the operations step SQ413 to step SQ418 until printing is completed for all pages.

In step SQ419, the image forming apparatus 100 notifies the printer server 140 of the completion of printing and inspection for all pages of the document data.

In step SQ420, the printer server 140 notifies the client PC 120 of the completion of printing and inspection for all pages of the document data to notify the user of the completion of printing and inspection.

The foregoing is the description of the processing in which the image forming apparatus 100 performs printing via the printer server 140, and the inspection PC 110 inspects a print product for a defective image according to the inspection settings set in the processing in FIG. 3A.

While the inspection PC 110 compares the RIP data size with the scan image size in step SQ329 in the present exemplary embodiment, the inspection PC 110 may cancel the processing if there is a large difference between the two sizes, assuming that the correct answer image generation failed. For example, if the RIP data size set in step SQ311 is A4 and the transferred RIP data size is equivalent to A3, there arises a difference of about 1.4 times between the two sizes in each direction. In such a case, possible causes of the difference include an incorrect sheet setting and/or a RIP resolution different from the desired setting. Thus, a suitable inspection is assumed to be infeasible. If the compared sizes are largely different as described above, the inspection PC 110 may display a warning message to prompt the user to cancel or continue the registration processing.

As described above, the present exemplary embodiment enables print image inspection by matching the size of the image data obtained through the RIP processing with the size of the image data obtained through scanning. Registration of a correct answer image with a margin which is a non-print region enables an inspection region to be set for the margin in making the inspection setting that is performed on the correct answer image described above in conjunction with FIG. 5.

A second exemplary embodiment of the present disclosure will be described below. In the first exemplary embodiment, a description has been provided of a method of performing trimming or white pixel addition for even distances with respect to the center of the page, as the size adjustment method for the RIP processing. In the present exemplary embodiment, a description will be provided of a case where a reference position is changeable with a user setting in performing the size adjustment method in the RIP processing of the printer server 140.

Regarding the present exemplary embodiment, a description will be provided of portions different from the first exemplary embodiment.

Figure 8:
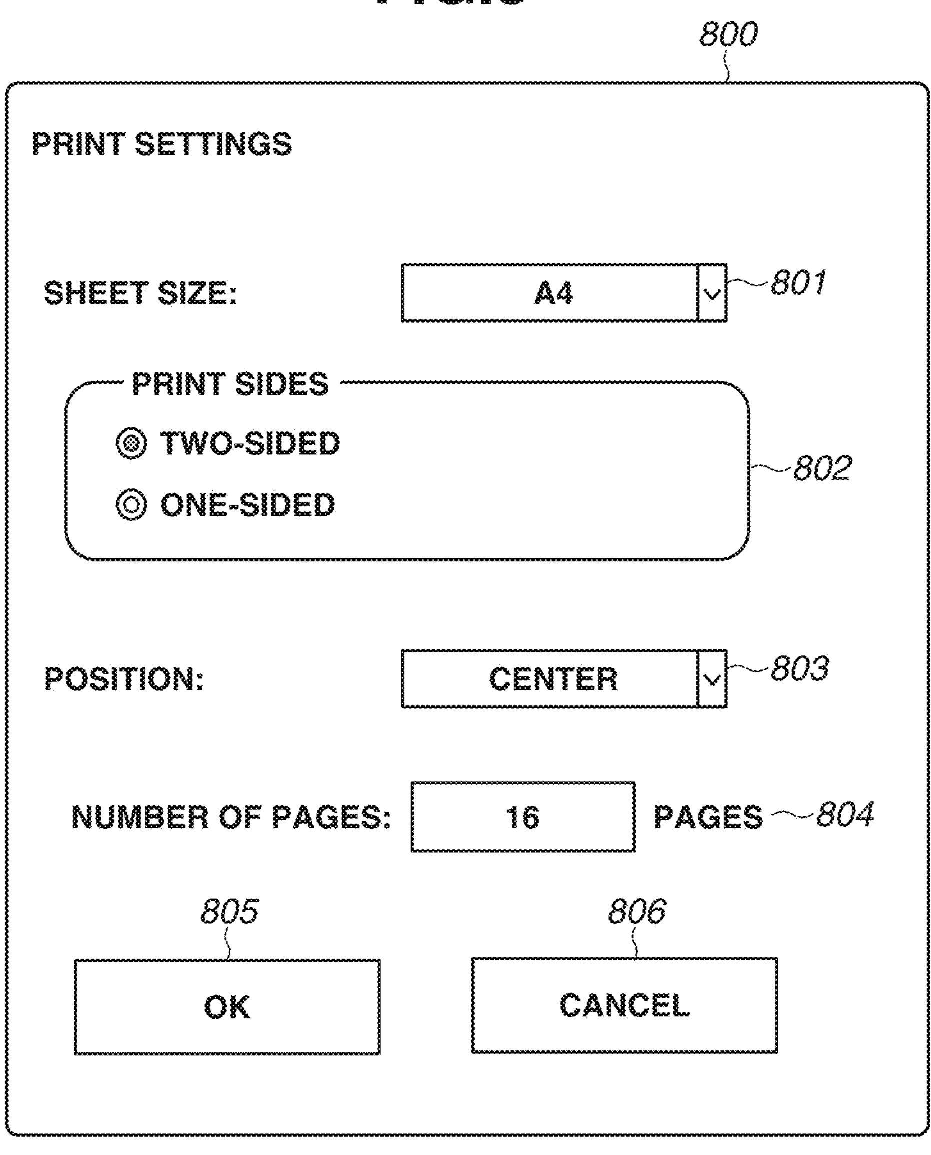
FIG. 8 illustrates an example of a UI screen for print settings according to a second exemplary embodiment.

FIG. 8 illustrates an example of a UI for setting information about the print settings according to the second exemplary embodiment. A UI 800 in FIG. 8 displayed on the UI unit 128 of the client PC 120 is used to input print settings related to the inspection processing.

A list box 801 is similar to the list box 601 according to the first exemplary embodiment, and a redundant description thereof will be omitted. A radio button 802 is similar to the radio button 602 according to the first exemplary embodiment, and a redundant description thereof will be omitted.

A list box 803 is a UI for setting a reference position in performing the size adjustment processing through the RIP processing of the printer server 140. When "Center" in the list box 803 is selected, trimming or white pixel addition is performed for even distances in the vertical and horizontal directions, as in the first exemplary embodiment. Other setting values include "Upper Left", "Upper Center", "Upper Right", "Right Center", "Bottom Right", "Bottom Center", "Bottom Left", and "Left Center". A method for determining the number of pixels to be trimmed or the number of white pixels to be added for each setting value will be described below.

A text box 804 is similar to the text box 603 according to the first exemplary embodiment, and a redundant description thereof will be omitted. Buttons 805 and 806 are similar to the buttons 604 and 605 according to the first exemplary embodiment, and redundant descriptions thereof will be omitted.

The foregoing is the description of the UI for setting the print settings related to the inspection processing according to the present exemplary embodiment.

FIG. 9 illustrates a table used to calculate weights for determining the number of pixels to be trimmed or the number of white pixels to be added when a setting value relating to the position in the list box 803 is changed. FIG. 9 illustrates a LUT that represents a relationship of weights in respective directions (Top, Bottom, Right, and Left) to be applied in performing trimming or white pixel addition according to the position selected in the list box 803. The printer server 140 prestores this LUT.

For example, when "Center" is selected, the trimming or white pixel addition is performed for even distances in the vertical and horizontal directions. Thus, the weight is set to "1" for all directions. According to the present exemplary embodiment, the sum of weights in the vertical and horizontal directions is "2", and the weight "1" indicates a half of the number of pixels to be trimmed or the number of white pixels to be added. Referring to FIG. 11C, when the weight is set to 1, h5=h6 and w5=w6 result.

For the setting value set to "Left", the left side is used as a reference position of the image, so that the trimming or white pixel addition is/are to be performed only on the right side. Thus, the weight is set to 0 on the left side and 2 on the right side. Referring to FIG. 11C, when the weight is set to 1, regarding the number of pixels to be trimmed or the number of white pixels to be added, w5 equals 0, and w6 is the number of pixels to be trimmed or the number of white pixels to be added.

Similarly, for the setting value set to "Top", the top is used as a reference position of the image, so that the trimming or white pixel addition is/are to be performed only on the bottom. For other settings, weighting is determined based on a similar concept, and the number of pixels to be trimmed or the number of white pixels to be added is calculatable.

A method of adjusting sheet size adjustment appropriate for the selected position setting is implementable by notifying the user of the weight setting based on the sheet size adjustment method notified of in step SQ325 in FIG. 3A, and by applying the method in step SQ330.

With the above-described configuration, the present exemplary embodiment makes it possible to perform the inspection with the matched sheet size and image position, even if the reference position is changed with the user settings, in the size adjustment processing through the RIP processing of the printer server 140.

A third exemplary embodiment of the present disclosure will be described below. According to an above-described exemplary embodiment, the printer server 140 performs the RIP processing for generating a correct answer image to be registered in the inspection PC 110 and the RIP processing for an image for printing. In the third exemplary embodiment, a description will be provided of a case where the inspection purpose RIP server 130 generates a correct answer image to be registered in the inspection PC 110. Elements not described below are similar to those according to the first and the second exemplary embodiments.

Figure 12:
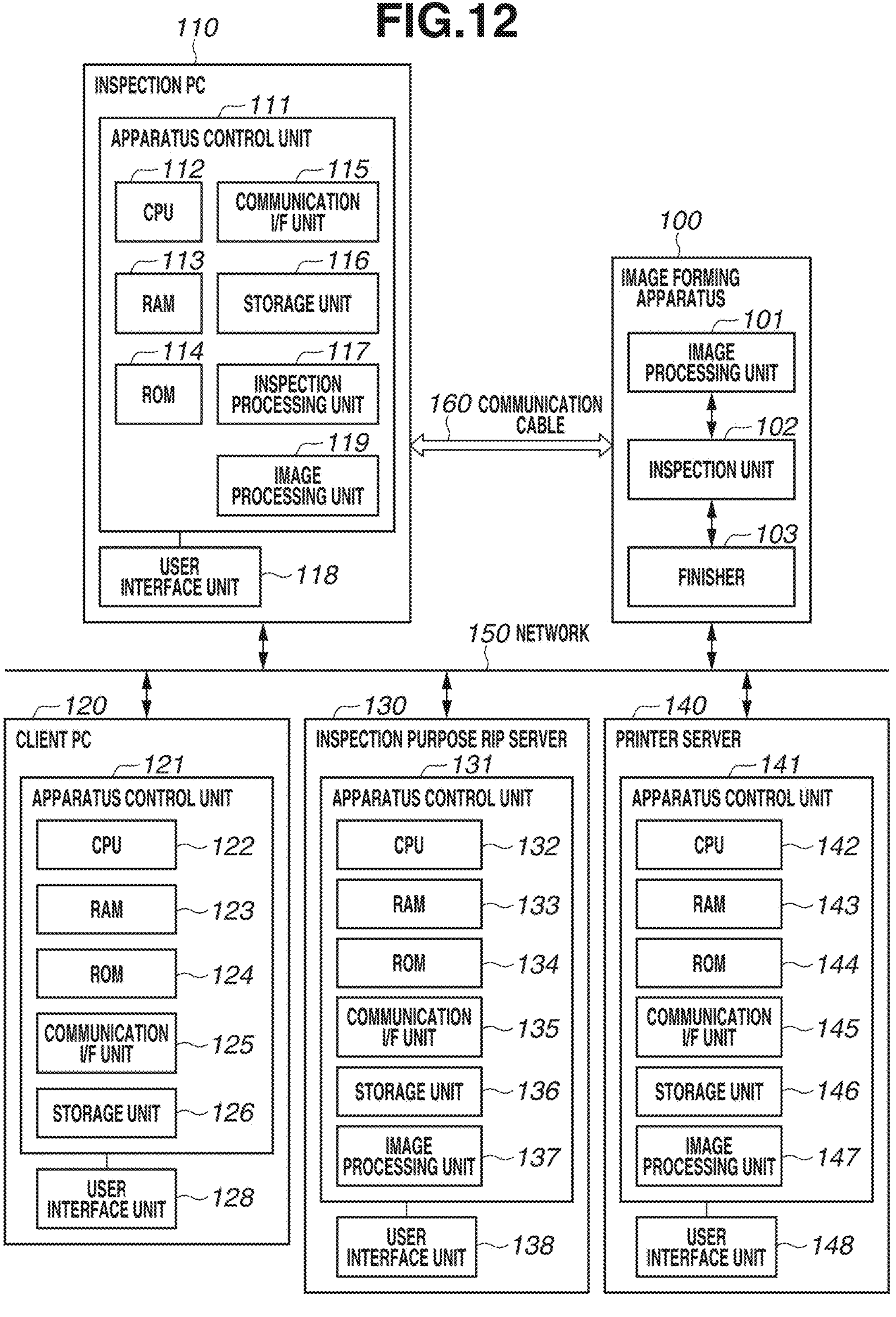
FIG. 12 illustrates an example of an overall configuration of an inspection system according to a third exemplary embodiment.

FIG. 12 illustrates an overall system configuration including the inspection apparatus according to the third exemplary embodiment. The present system includes the image forming apparatus 100, the inspection PC 110, the client PC 120, the inspection purpose RIP server 130, the printer server 140, the network 150, and the communication cable 160. The image forming apparatus 100, the inspection PC 110, the client PC 120, and the printer server 140 illustrated in FIG. 12 have been described above with reference to FIG. 1, and detailed descriptions thereof will be omitted.

The inspection purpose RIP server 130 includes an apparatus control unit 131 and a UI unit 138 and subjects the print and document data to the RIP processing to generate a correct answer image for inspection. The apparatus control unit 131 includes a controller board, and mounts thereon a CPU 132, a RAM 133, a ROM 134, a communication I/F unit 135, a storage unit 136, and an image processing unit 137. The roles of these apparatuses in the inspection purpose RIP server 130 are similar to those of the apparatuses in the inspection PC 110 except for the image processing unit 137, and redundant descriptions thereof will be omitted.

The image processing unit 137 subjects the print and document data transmitted from the client PC 120 to the RIP processing for generating a correct answer image for inspection, and converts the data into bitmap image data. More specifically, the RIP processing for generating a correct answer image for inspection converts a resolution of 600 dpi to a resolution of 300 dpi to generate an image.

According to the present exemplary embodiment, the inspection purpose RIP server 130 includes a plurality of the CPUs 132 to enable parallel processing in which each CPU performs the RIP processing on a page basis. Thus, the use of the inspection purpose RIP server 130 separately from the printer server 140 enables reduction in time taken for the correct answer image registration.

Figure 13:
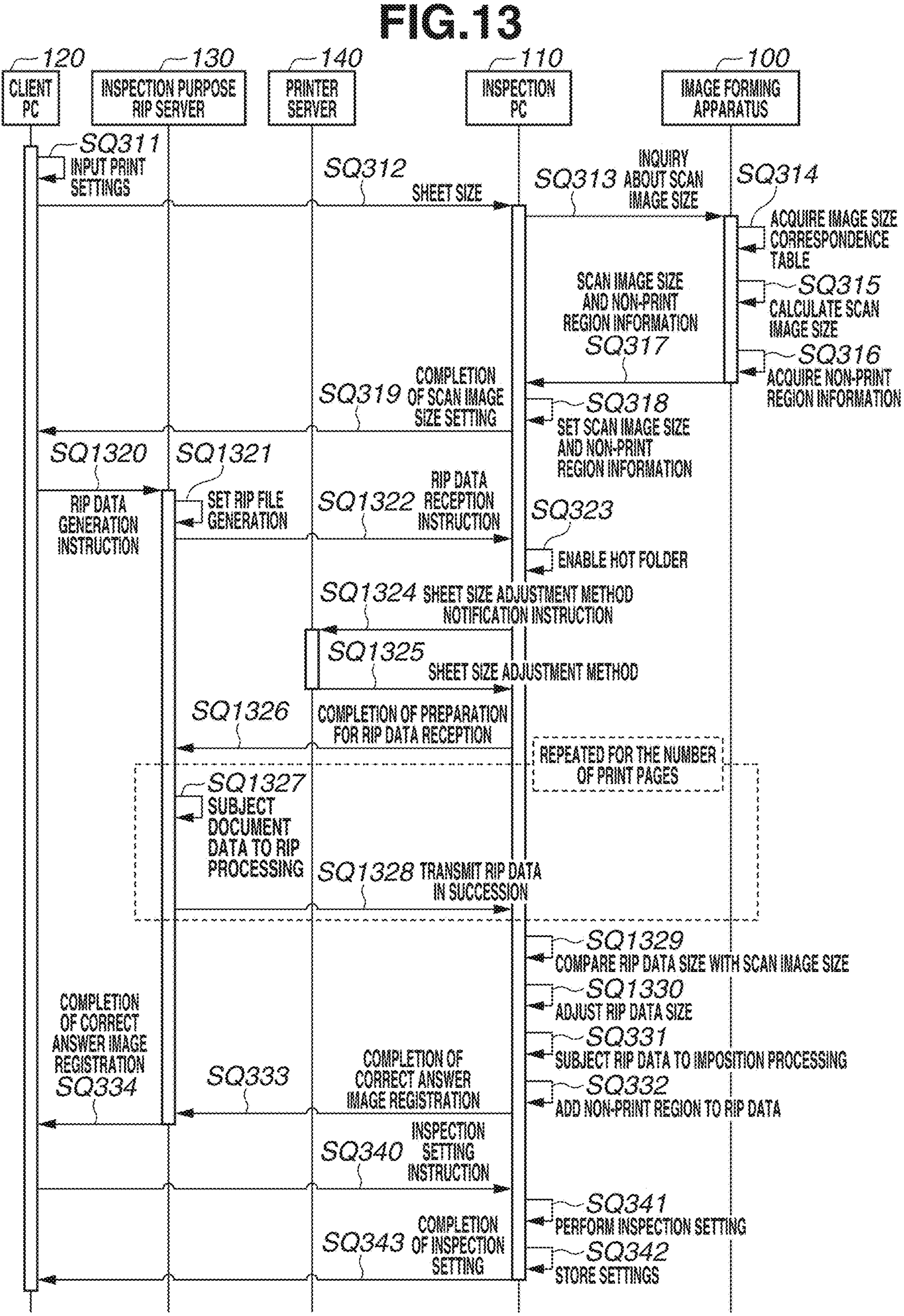
FIG. 13 is a sequence diagram illustrating correct answer image registration processing according to the third exemplary embodiment.

FIG. 13 is a sequence diagram illustrating the correct answer image registration processing according to the third exemplary embodiment. In this processing, the inspection purpose RIP server 130 subjects the print data to the RIP processing to generate image data and then arranges the generated image data in order of printing to be inspected. Performing these pieces of processing completes the registration of the correct answer image and inspection settings, which is to be performed before the inspection of the print product. The processing of the inspection purpose RIP server 130 in this sequence is implemented when a program code stored in the storage unit 136 is loaded into the RAM 133, and the apparatus control unit 131 is controlled by the CPU 132. The processing of image forming apparatus 100 is implemented when a program code stored in the storage unit 203 is loaded into the RAM 202, and the apparatus control unit 200 is controlled by the CPU 201. The operations in Steps SQ311 to SQ319 and S331 to S343 are similar to those in FIG. 3A, and redundant descriptions thereof will be omitted.

When the client PC 120 receives a notification of the completion of the scan image size setting from the inspection PC 110 in step SQ319, the processing proceeds to step SQ1320.

In step SQ1320, the client PC 120 instructs the inspection purpose RIP server 130 to perform processing for registering the correct answer image. More specifically, the client PC 120 instructs the inspection purpose RIP server 130 to generate RIP data based on the document data and transmit the data to the inspection PC 110. According to the present exemplary embodiment, the document data serving as the original data of the RIP data generation is transmitted from the client PC 120 to the inspection purpose RIP server 130 at this timing.

In step SQ1321, the inspection purpose RIP server 130 sets files to be generated in the RIP processing. The file setting is performed via the UI screen illustrated in FIG. 10 displayed on the UI unit 138 of the inspection purpose RIP server 130.

The foregoing is the description of the UI for setting information about files to be generated in the RIP processing according to the present exemplary embodiment.

In step SQ1322, the inspection purpose RIP server 130 instructs the inspection PC 110 to prepare to receive the RIP data to be transferred from the client PC 120. Here, the inspection purpose RIP server 130 transmits settings of an order rule for generation of files in the RIP processing set in step SQ1321 to the inspection PC 110.

In step SQ323, the inspection PC 110 enables the hot folder with the output destination setting for the RIP file set in step SQ1321 being set to a monitoring target. According to the present exemplary embodiment, the setting of the text box 1001 is used as the setting of the output destination of the RIP file. The inspection PC 110 checks whether a file transfer event occurs in the hot folder set to the monitoring target, and, as soon as the RIP data transfer is completed, performs an operation in step SQ1329 (described below).

In step SQ1324, the inspection PC 110 acquires the sheet size adjustment method from the printer server 140. Here, the sheet adjustment method indicates a RIP processing method performed by the image processing unit 147 to adjust the document data size to the print sheet size.

In step SQ1325, the printer server 140 notifies the inspection PC 110 of a method for adjusting the document data size to the print sheet size, which is performed in the RIP processing of the image processing unit 147. As information about the size adjustment method according to the present exemplary embodiment, the printer server 140 notifies the inspection PC 110 of the ratios of the numbers of pixels to be changed in the vertical and horizontal directions in trimming pixels or adding white pixels. For example, if pixels are evenly trimmed as in the present exemplary embodiment, the ratios in the vertical and horizontal directions are set to one. The notification method according to the present exemplary embodiment conforms to the JavaScript Object Notation (JSON) or Extensible Markup Language (XML) format.

The present exemplary embodiment conforms to only one size adjustment method. If a plurality of size adjustment methods is provided, the printer server 140 notifies the inspection PC 110 of the plurality of size adjustment methods for each setting.

In step SQ1326, the inspection PC 110 notifies the inspection purpose RIP server 130 of the completion of the series of operations for receiving the RIP data.

In step SQ1327, the inspection purpose RIP server 130 performs the RIP processing for each page to generate RIP data based on the document data received from the client PC 120 in step SQ1320 and the information about the print settings set in step SQ311. According to the present exemplary embodiment, the inspection purpose RIP server 130 includes a plurality of the CPUs 132 to enable parallel processing in which each CPU performs the RIP processing on a page basis. The present exemplary embodiment is not limited thereto. A form of distributed processing using a plurality of RIP servers for inspection is also applicable.

In step SQ1328, as soon as one page of the RIP data is generated in step SQ1327, the inspection purpose RIP server 130 successively transfers the data to the hot folder serving as the monitoring target in the inspection PC 110. The inspection purpose RIP server 130 repeats the operations in steps SQ1327 and SQ1328 for the number of print pages of the document data.

According to the present exemplary embodiment, if different RIP data is transferred during the repetitive processing, the data is used for the processing for the last received RIP data and the subsequent processing. However, any one of duplicated files may be used. If the received RIP data has a different vertical or horizontal size of the image data or a different file name from that of the initially received RIP data, the inspection PC 110 does not receive the RIP data. If the received RIP data has a different vertical or horizontal size of the image data or a different file name, different document data may have been subjected to the RIP processing in a mixed state.

Omitting to process the RIP data having a different format enables different document data to be prevented from being inspected in a mixed state.

In step SQ1329, the inspection PC 110 compares the size of the RIP data transferred in step SQ1328 with the scan image size. Detailed operation is similar to that in step SQ329 in FIG. 3A.

In step SQ1330, the image processing unit 119 of the inspection PC 110 also performs RIP data size adjustment processing according to the size adjustment method acquired in step SQ1325 in both the main and the sub scanning directions based on a result of the comparison in step SQ1329. If the number of pixels of the RIP data is larger than that of the scan image, the image processing unit 119 trims the RIP data which is the method obtained in step SQ1325. If the number of pixels of the RIP data is smaller than that of the scan image, the image processing unit 119 adds white pixels to the RIP data which is the method obtained in step SQ1325. The specific embodiment method is similar to the method performed by the image processing unit 137 of the printer server 140 described above with reference to FIGS. 11A to 11C. The operations in step SQ331 and subsequent steps are similar to those described above in conjunction with FIG. 3A, and redundant descriptions thereof will be omitted.

The size adjustment processing performed in step SQ1330 and the non-print region addition processing performed in step SQ332 will be further described below with reference to FIGS. 14A and 14B.

Figures 14A, 14B:
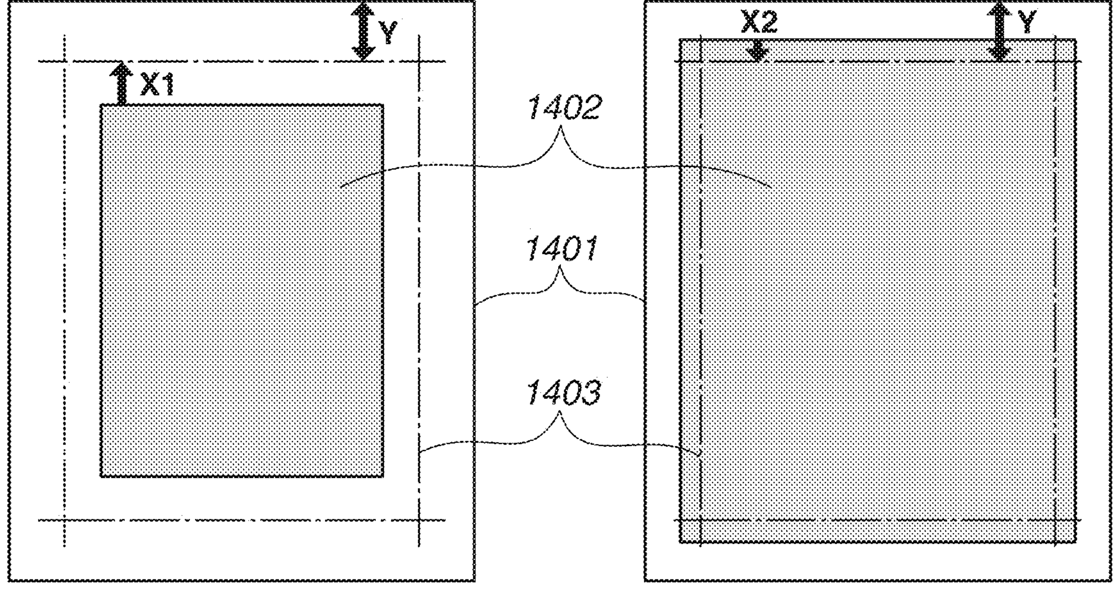
FIGS. 14A and 14B illustrate examples of overall processing related to size adjustment processing according to the third exemplary embodiment.

Referring to FIGS. 14A and 14B, a sheet size 1401 refers to the sheet size obtained in step SQ331. A document data size 1402 refers to the size of the document data generated in the RIP processing by the inspection purpose RIP server 130 in step SQ1327.

Auxiliary lines schematically indicate a print region 1403 in the sheet size 1401.

FIG. 14A schematically illustrates a case where the document data size 1402 is smaller than the print region 1403, and FIG. 14B schematically illustrates a case where the document data size 1402 is larger than the print region 1403. While FIGS. 14A and 14B illustrate only explanation for the top edge of the sheet, printing is actually performed in both the main and the sub scanning directions.

In the RIP data size adjustment processing performed in step SQ1330, the inspection PC 110 performs the white pixel addition in the direction X1 or the trimming processing in the direction X2. This description is similar to the description made in conjunction with FIGS. 11A and 11B.

The non-print region addition performed in step SQ332 is operation for adding white pixels to the region Y. This description is similar to the description made in conjunction with FIG. 11C.

The inspection PC 110 processes the document data size 1402 obtained according to the print region 1403 in the sheet size 1401. The processed image is registered in the inspection PC 110 as a correct answer image.

As described above, the present exemplary embodiment registers the correct answer image in consideration of the difference between the document data to be subjected to the RIP processing by the inspection purpose RIP server 130 and the RIP data to be subjected to the RIP processing by the printer server 140. The document data here is an image to be registered as a correct answer image, and the RIP processing of the printer server 140 is processing for printing an image on a recording sheet. Thus, the size of the image data obtained through the RIP processing matches with the size of the image data obtained through the scanning, thereby enabling print image inspection.

While embodiments of the present disclosure have specifically been described based on the above-described exemplary embodiments, the spirit and scope of the present disclosure are not limited to specific descriptions within the present specification. The present exemplary embodiment enables print image inspection by matching the size of the image data obtained through the RIP processing with the size of the image data obtained through the scanning.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-016800, filed Feb. 7, 2023, which is hereby incorporated by reference herein in its entirety.

What is claimed is:

1. An inspection apparatus configured to inspect a print product obtained by an image forming apparatus performing print on a recording sheet, the inspection apparatus comprising:

one or more controllers having one or more processors and one or more memories, the one or more controllers being configured to:

acquire an image and information about a non-print region as a region in which no image is printed on the recording sheet by the image forming apparatus;

perform registration to register an image having been processed based on the information about the non-print region, as a correct answer image;

inspect, in response to acquiring a scan image obtained by scanning the print product with an image printed on the recording sheet, the scan image based on the correct answer image;

receive a first image generated by an image processing apparatus configured to perform image generation through image processing, the inspection apparatus being communicably connected to the image processing apparatus; and generate a second image from the first image based on size information for the print product printed by the image forming apparatus, wherein, in the registration, the second image is registered as the correct answer image.

2. The inspection apparatus according to claim 1, wherein the one or more controllers are configured so that, in the registration, the image having been subjected to processing for adding white pixels based on the information about the non-print region is registered as the correct answer image.

3. The inspection apparatus according to claim 2, wherein the one or more controllers are configured so that, in the processing for adding white pixels, white pixels are added for even distances in the vertical and horizontal directions.

4. The inspection apparatus according to claim 1, wherein the information about the non-print region corresponds to a size of the recording sheet.

5. The inspection apparatus according to claim 1, wherein the one or more controllers are configured so that, in the inspection, the scan image is inspected based on a comparison between the scan image and the correct answer image.

6. The inspection apparatus according to claim 1, wherein the image is bitmap image data.

7. The inspection apparatus according to claim 1, wherein the one or more controllers are configured to add, in a case where a size indicated by the size information for the print product is larger than a size of the first image based on a comparison between the size indicated by the size information and the size of the first image, white pixels to the first image to generate the second image.

8. The inspection apparatus according to claim 1, wherein the one or more controllers are configured to trim, in a case where a size indicated by the size information for the print product is smaller than a size of the first image based on a comparison between the size indicated by the size information and the size of the first image, the first image to generate the second image.

9. The inspection apparatus according to claim 1, wherein the size information for the print product includes a number of pixels in a main scanning direction and a number of pixels in a sub scanning direction.

10. A method for controlling an inspection apparatus configured to inspect a print product obtained by an image forming apparatus performing print on a recording sheet, the method comprising:

acquiring information about a non-print region as a region in which no image is printed on the recording sheet by the image forming apparatus;

processing an image based on the information about the non-print region;

performing registration to register the processed image as a correct answer image;

inspecting, in response to acquiring a scan image obtained by scanning the print product with an image printed on the recording sheet, the scan image based on the correct answer image;

receiving a first image generated by an image processing apparatus configured to perform image generation through image processing, the inspection apparatus being communicably connected to the image processing apparatus; and generating a second image from the first image based on size information for the print product printed by the image forming apparatus, wherein, in the registration, the second image is registered as the correct answer image.

* * * * *